(12) United States Patent
Bertolotti et al.

(10) Patent No.: US 12,370,476 B2
(45) Date of Patent: Jul. 29, 2025

(54) DEVICE AND METHOD FOR FILTERING A FLUID CIRCULATING IN A PLUMBING AND HEATING SYSTEM

(71) Applicant: I.V.A.R. S.P.A., Prevalle (IT)

(72) Inventors: Umberto Bertolotti, Prevalle (IT); Mario Contini, Flero (IT)

(73) Assignee: I.V.A.R. S.P.A., Prevalle (IT)

( * ) Notice: Subject to any disclaimer, the term of this patent is extended or adjusted under 35 U.S.C. 154(b) by 301 days.

(21) Appl. No.: 17/292,954

(22) PCT Filed: Oct. 30, 2019

(86) PCT No.: PCT/IB2019/059299
§ 371 (c)(1),
(2) Date: May 11, 2021

(87) PCT Pub. No.: WO2020/099972
PCT Pub. Date: May 22, 2020

(65) Prior Publication Data
US 2022/0001312 A1 Jan. 6, 2022

(30) Foreign Application Priority Data
Nov. 14, 2018 (IT) .................. 102018000010324

(51) Int. Cl.
*B01D 35/06* (2006.01)
*B01D 35/02* (2006.01)
(Continued)

(52) U.S. Cl.
CPC ............ *B01D 35/06* (2013.01); *B01D 35/02* (2013.01); *B01D 35/15* (2013.01); *B01D 35/306* (2013.01);
(Continued)

(58) Field of Classification Search
CPC ........ B01D 35/06; B01D 35/02; B01D 35/15; B01D 35/306; B01D 2201/165;
(Continued)

(56) References Cited

U.S. PATENT DOCUMENTS

| 5,826,854 A | 10/1998 | Janvrin et al. |
| 2005/0155925 A1* | 7/2005 | Schipper ............... F24D 19/087 |
| | | 210/497.1 |

(Continued)

FOREIGN PATENT DOCUMENTS

| EP | 3159313 A1 * | 4/2017 | ............. B01D 29/23 |
| WO | 2011055149 A2 | 5/2011 | |

OTHER PUBLICATIONS

Search Report dated Feb. 13, 2020 in corresponding International Application No. PCT/IB2019/059299, 3 pages.
(Continued)

*Primary Examiner* — Liam Royce
(74) *Attorney, Agent, or Firm* — MH2 TECHNOLOGY LAW GROUP LLP

(57) ABSTRACT

A device for the filtration of a fluid comprise a body of the device defining a filtration chamber and equipped with: a filtering element which divides the filtration chamber into a first and a second half-chamber; an inlet/outlet interface having a first inlet/outlet opening and a second inlet/outlet opening. A connection module is mounted on the body of the device and comprises a first inlet/outlet conduit and a second inlet/outlet conduit; a connection interface associated with the inlet/outlet interface and having a first passage section in fluid communication with the first inlet/outlet conduit and a second passage section in fluid communication with the second inlet/outlet conduit. The connection module is selectively mounted on the body of the device according to a plurality of different operative configurations.

19 Claims, 8 Drawing Sheets

(51) Int. Cl.
  *B01D 35/15* (2006.01)
  *B01D 35/30* (2006.01)
  *B03C 1/033* (2006.01)
  *B03C 1/28* (2006.01)
  *C02F 1/00* (2023.01)
  *C02F 1/48* (2023.01)
  *C02F 101/20* (2006.01)

(52) U.S. Cl.
  CPC ............ *B03C 1/0332* (2013.01); *B03C 1/288* (2013.01); *C02F 1/001* (2013.01); *C02F 1/482* (2013.01); *B03C 2201/18* (2013.01); *C02F 2101/203* (2013.01)

(58) Field of Classification Search
  CPC ... B03C 1/0332; B03C 1/288; B03C 2201/18; C02F 1/001; C02F 1/482; C02F 2101/203
  See application file for complete search history.

(56) References Cited

U.S. PATENT DOCUMENTS

2010/0200490 A1* 8/2010 Martin .................. B01D 35/30
                                                              210/232
2015/0182894 A1    7/2015 Shaffer et al.

OTHER PUBLICATIONS

Written Opinion dated Feb. 13, 2020 in corresponding International Application No. PCT/IB2019/059299, 5 pages.

\* cited by examiner

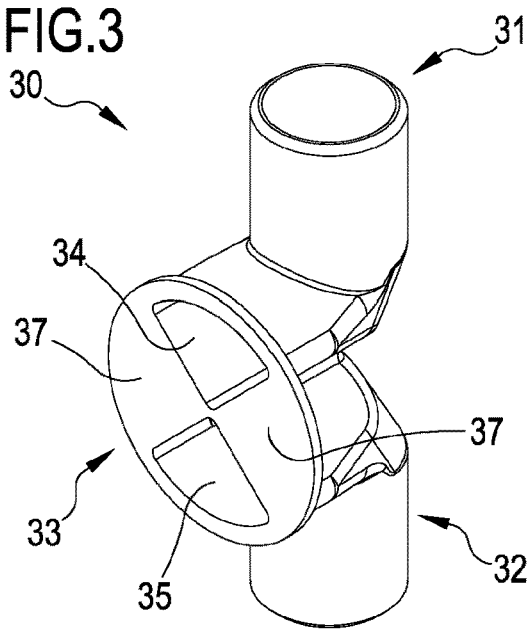
FIG.3
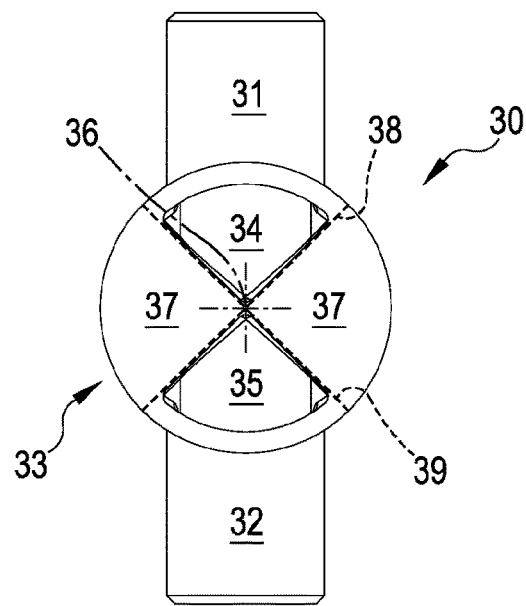
FIG.4
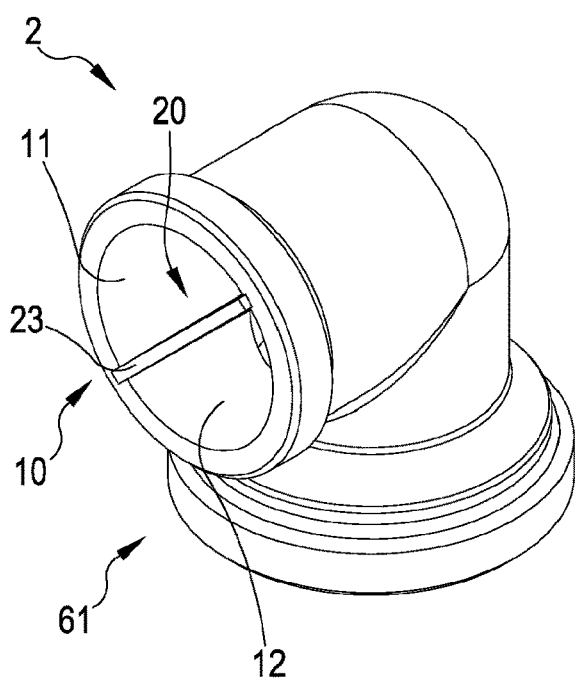
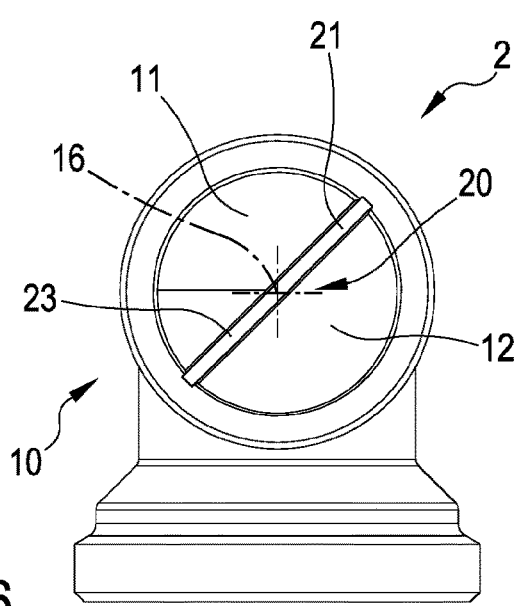
FIG.5
FIG.6

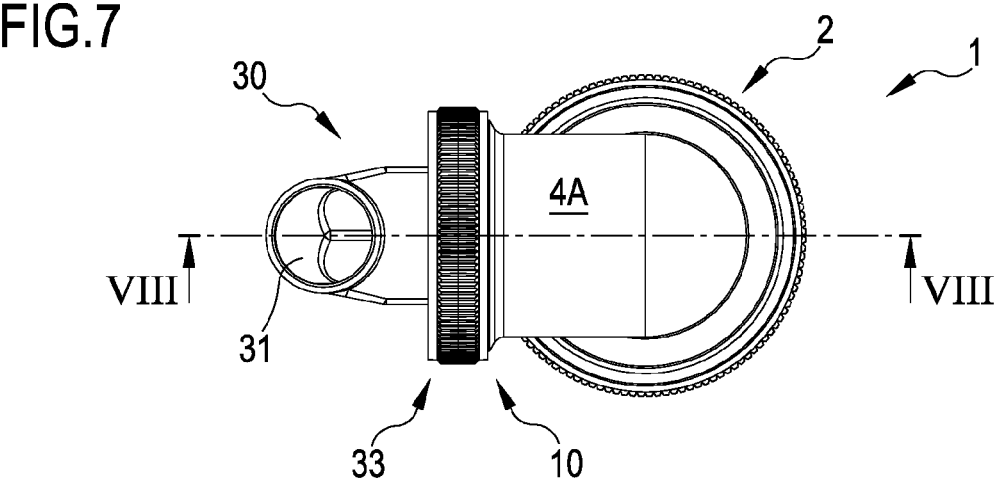

DEVICE AND METHOD FOR FILTERING A FLUID CIRCULATING IN A PLUMBING AND HEATING SYSTEM

CROSS-REFERENCE TO RELATED APPLICATIONS

This application is a U.S. National Stage application of PCT/IB2019/059299 filed Oct. 30, 2019, pending, which claims priority to Italian Patent Application No. 102018000010324 filed Nov. 14, 2018, the entire disclosures of which are hereby incorporated by reference in their entireties.

The present invention relates to a device, and a method thereof, for filtering a fluid circulating in a plumbing and heating system.

The invention is advantageously applied in the context of water plants for temperature regulation and/or for supplying domestic hot water in buildings of residential, commercial or industrial type.

Heating systems or systems for supplying domestic hot water provide for the circulation of a fluid, typically water, that circulates through the various components of the system (pipes, boiler, pump, valves, radiating elements, utilities, etc.).

In such systems, the use is known of filters for maintaining the circulating fluid as clean as possible, i.e. free of impurities, such as dirt, sand, polluting particles, etc. This is because these impurities circulating inside the system can cause cloggings, faults in certain components, in particular the boiler and the valves, and generally diminish performance of the various components and a loss of total efficiency.

Of the various impurities, it is particularly important to remove ferrous particles—typically released by components of the system such as piping and radiating elements (for example heaters and radiators)—as they may cause breakages inside the members of the boiler or pierce the system lines.

Usually the filters are installed interposed between the conduit carrying the fluid returning from the system, which is typically full of impurities and ferrous particles, and the conduit that sends the fluid entering the central heating unit (for example the boiler or heat pump). In this manner, the filter can act on the delivery to the central heating unit, i.e. upstream of the latter, sending fluid that is filtered and purified of impurities.

In general, the known filters can be installed along any fluid conduit, in order to intercept it, subject it to filtration and make it continue along the conduit.

In the jargon of the technical field, such filters are often referred to as "dirt separators", because of their function of removing impurities.

Providing for the filter to be able to be opened to perform periodic maintenance tasks and in particular to remove impurities collected by the filter or replace the filtering elements is also known.

One known type of filter type provides for both the use of mesh filtering elements that retain impurities such as sand and dirt and the use of filtering elements of magnetic type that enable the ferrous particles to be separated from the fluid in transit by attracting the particles and retaining the particles in contact with the magnetic element. Typically, the known types of filters have a fluid inlet and a fluid outlet; the conduit (upstream of the filter) carrying the fluid to be filtered is connected to the inlet of the filter, while the outlet of the filter is in turn connected with the successive conduit (downstream of the filter) so that the filtered fluid will continue its path in the system. The inlet carries the fluid to a central portion of the inner chamber of the filter, at which a mechanical filtration takes place, and from this central portion the fluid passes to a more outer portion—circularly surrounding the central portion—of the filter chamber, from which the fluid is then directed towards the outlet of the filter which sends the filtered fluid to the conduit to continue its path in the system. In the lower part of the filter, beneath the central portion of the chamber, a drain cock is present for the removal of the impurities filtered by the filter. The mechanical filtration is typically performed by means of a filtering element arranged in the central portion of the chamber and consists of a lattice wound about itself several times to form a cylindrical body.

Cyclonic filters are also known, which instead provide a tangential inlet and an axial outlet. Such filters exploit the centrifugal force of the water that enters tangentially, which causes a separation of sand and other particles which strike the filter wall and fall downwards, where they are collected and can be removed, while the water performs a spiral motion downwards and then rises axially, to the centre of the filter, up to the outlet.

The Applicant has found that the known solutions described above are not free of drawbacks and various aspects thereof are improvable.

First of all, the known solutions can operate correctly only by connecting the inlet to the conduit that carries the fluid to be treated and the outlet to the conduit downstream of the filter. This is because the known solutions always entail an obligatory and non-reversible path of the fluid to be treated, which in the case of mesh filtering elements goes from the inlet to the central portion of the inner chamber and then subsequently passes into the outermost annular portion, and from this towards the outlet, while in the case of cyclonic filtration goes from the tangential inlet in the outermost portion of the chamber and then pass in the central portion, and from this towards the outlet.

This means that, in the case in which the inlet and outlet connection of the filter to the conduits upstream and downstream of the filter itself is carried out in a contrary manner, the filter would not be able to operate.

In essence, the known filters only operate efficiently in one configuration, and the installation must be carried out respecting the precise flow direction; for this reason arrows are present on the inlet and outlet openings that indicate the mounting direction.

In addition, the known solutions have a risk of clogging the filtering element (the cylindrical lattice) that operates the mechanical filtering, by non-optimum use of the flows circulating inside the filtration chamber. The clogging can introduce flow rate loss through the filter, or also cause a complete blockage.

Furthermore, the known filters are unable to provide effective solutions in terms of assembly, access and maintenance for all the different installation conditions and the different types of heating systems.

In this situation, the object that is the basis of the present invention in its various aspects and/or embodiments is to provide a device and a method for filtering a fluid that can be able to remedy one or more of the aforesaid drawbacks.

A further object of the present invention is to provide a device and a method that are able to perform effective filtration of a fluid circulating in a plumbing and heating system.

A further object of the present invention is to provide a device for filtering a fluid that is characterized by great versatility and is able to adapt to a great number and type of different heating systems and relative conduits.

A further object of the present invention is to provide a device for filtering a fluid that is able to operate with uniform and high performance regardless of the mode of installation inside a plumbing and heating system.

A further object of the present invention is to provide a device for filtering a fluid characterized by great operating reliability and/or by less predisposition to faults and malfunctions and/or is able to be maintained simply and rapidly.

A further object of the present invention is to provide a device for filtering a fluid characterized by a simple and rational structure.

A further object of the present invention is to provide a device for filtering a fluid characterized by modest production costs with respect to the performance and quality offered.

A further object of the present invention is to create alternative solutions to the prior art, in making devices and methods for filtering a fluid circulating in a plumbing and heating system, and/or opening new design fields.

These aims and other possible aims that will become more apparent during the following description are substantially achieved by a device for filtering a fluid and a method for filtering a fluid in accordance with one or more of the accompanying claims, each of which taken alone (without the corresponding appended clauses) or in any combination with the other claims, and according to the following aspects and/or embodiments, variously combined, also with the aforesaid claims.

In a first aspect, the invention relates to a device for filtering a fluid circulating in a plumbing and heating system, comprising a body of the device defining therewithin a filtration chamber that is destined to have a fluid to be subjected to filtration pass through it.

In one aspect, the body is equipped with:
  an inlet/outlet interface configured to allow the entry and the exit of the fluid into and from said filtration chamber;
  filtering members that are at least partially housed inside said filtration chamber, or associated with said body of the device, and configured to carry out filtering of the fluid passing through the filtration chamber, wherein said filtering members comprise at least one filtering element configured to perform a mechanical separation of substances and solid particles present in the fluid to be treated from the fluid in which they are suspended, said filtering element being arranged inside said filtration chamber so as to divide the filtration chamber into a first half-chamber and a second half-chamber, and in such a manner that the fluid transiting in the filtration chamber passes through said filtering element in order to pass from said first half-chamber to said second half-chamber, or vice versa;
  a first inlet/outlet opening, defined on a portion of said inlet/outlet interface, which sets said first half-chamber in communication with the outside of the body and is configured to receive fluid entering said body or to send fluid exiting from said body;
  a second inlet/outlet opening, defined on a respective portion of said inlet/outlet interface and distinct and separate from said first inlet/outlet opening, which sets said second half-chamber in communication with the outside of the body and is configured to send fluid exiting from said body or receive fluid entering said body.

In one aspect, the device comprises a connection module which can be mounted, preferably removably, to said body of the device.

In one aspect, the connection module comprises:
  a first inlet/outlet conduit, configured to be associated with a pipe of a heating system in order to receive therefrom, or send thereto, fluid entering or exiting said body of the device;
  a second inlet/outlet conduit, configured to be associated with a respective pipe of a heating system to send thereto, or receive therefrom, fluid exiting or entering said body of the device;
  a connection interface configured to be selectively associated, according to a plurality of operative configurations, with said inlet/outlet interface of the body of the device;
  a first passage section, defined on a portion of said connection interface, in fluid communication with said first inlet/outlet conduit;
  a second passage section, defined on a respective portion of said connection interface and distinct and separate from the first passage section, in fluid communication with said second inlet/outlet conduit.

In one aspect the connection module is configured to be selectively mounted on the body of the device according to a plurality of different operative configurations.

In one aspect, said plurality of operative configurations comprises at least:
  a first operative configuration, wherein the connection module and the body of the device have a first reciprocal positioning which determines:
    the correspondence of the first passage section with at least one portion of the first inlet/outlet opening of the body of the device, with a fluid connection of the first inlet/outlet conduit exclusively with the first half-chamber, and
    the correspondence of the second passage section with at least one portion of the second inlet/outlet opening of the body of the device, with a fluid connection of the second inlet/outlet conduit exclusively with the second half-chamber;
  a second operative configuration, wherein the connection module and the body of the device have a second reciprocal positioning which determines:
    the correspondence of the first passage section with at least one respective portion of the first inlet/outlet opening (at least partially distinct from the portion of the first operative configuration) of the body of the device, with a fluid connection of the first inlet/outlet conduit exclusively with the first half-chamber, and
    the correspondence of the second passage section with at least one respective portion of the second inlet/outlet opening (at least partially distinct from the portion of the first operative configuration) of the body of the device, with a fluid connection of the second inlet/outlet conduit exclusively with the second half-chamber;

In one aspect the passage between the first and the second operative configuration entails a roto-translation or (reciprocal) rotation of the connection module relative to the body of the device.

In one aspect, said plurality of operative configurations comprises:
  a third operative configuration, wherein the connection module and the body of the device have a third reciprocal positioning which determines:

the correspondence of the first passage section with at least one respective portion of the second inlet/outlet opening of the body of the device, with a fluid connection of the first inlet/outlet conduit exclusively with the second half-chamber, and the correspondence of the second passage section with at least one respective portion of the first inlet/outlet opening of the body of the device, with a fluid connection of the second inlet/outlet conduit exclusively with the first half-chamber;

a fourth operative configuration, wherein the connection module and the body of the device have a fourth reciprocal positioning which determines:

the correspondence of the first passage section with at least one respective portion of the second inlet/outlet opening (at least partially distinct from the portion of the third operative configuration) of the body of the device, with a fluid connection of the first inlet/outlet conduit exclusively with the second half-chamber, and the correspondence of the second passage section with at least one respective portion of the first inlet/outlet opening (at least partially distinct from the portion of the third operative configuration) of the body of the device, with a fluid connection of the second inlet/outlet conduit exclusively with the first half-chamber.

In one aspect the passage between the third and the fourth operative configuration entails a roto-translation or (reciprocal) rotation of the connection module relative to the body of the device.

In one aspect the passage between the first operative configuration and the second operative configuration, and/or the passage between the third operative configuration and the fourth operative configuration, and/or the passage between the first operative configuration and the third operative configuration, and/or the passage between the second operative configuration and the fourth operative configuration, and/or the passage between the first operative configuration and the fourth operative configuration, and/or the passage between the second operative configuration and the third operative configuration, entails a rotation of the connection module relative to the body of the device without translations of those two elements.

In one aspect, each different reciprocal rotation between the connection module and the body of the device defines a respective operative configuration, i.e. the reciprocal rotation between the connection module and the body of the device—which takes place continuously and not in a discrete manner—through a plurality of continuous operative configurations (of which the first, second, third and fourth operative configuration preferably constitute a subset).

An independent aspect of the present invention relates to a heating system comprising a device according to one or more of the above aspects.

An independent aspect of the present invention relates to a method for filtering a fluid circulating in a plumbing and heating system, comprising the steps of:

arranging at least one device for filtering a fluid;

identifying a conduit coming from a plumbing and heating system, in particular a hot water return pipe from a system of heating elements, carrying a flow of water to be subjected to filtration;

identifying a conduit leading to a central heating unit of the plumbing and heating system, this pipe carrying thereto a flow of water that has undergone filtration;

operating the device selectively in one of the aforesaid conditions of use.

In one aspect, said operating step comprises the steps of:

connecting the pipe coming from a plumbing and heating system to either said first or second inlet/outlet conduit (whichever desired);

connecting the pipe leading to a central heating unit of the plumbing and heating system to the other conduit between said first and second inlet/outlet conduit;

selecting one of said operative configurations and mounting the connection module on the body of the device with the correct reciprocal positioning in accordance with the selected operative configuration.

Each of the aforesaid aspects of the invention can be taken on its own or in combination with any one of the claims or of the other disclosed aspects.

Further features and advantages will become more apparent from the detailed description of some example, but not exclusive embodiments, also including a preferred embodiment, of a device and a method for filtering a fluid circulating in a plumbing and heating system in accordance with the present invention. This description will be set out below with reference to the appended drawings, which are provided solely for indicative and therefore non-limiting purposes, in which:

FIG. 3 shows a perspective view, with some parts removed, of a connection module forming part of the device of FIG. 1;

FIG. 4 shows a front view of the connection module of FIG. 3;

FIG. 5 shows a perspective view of a part of the body of the device of FIG. 1;

FIG. 6 shows a front view of the body of FIG. 5;

FIG. 7 shows a top view of the device of FIG. 1 in a first operative configuration;

FIG. 8 shows a sectional view, along the plane VIII-VIII, of the device of FIG. 7;

Figure 1:
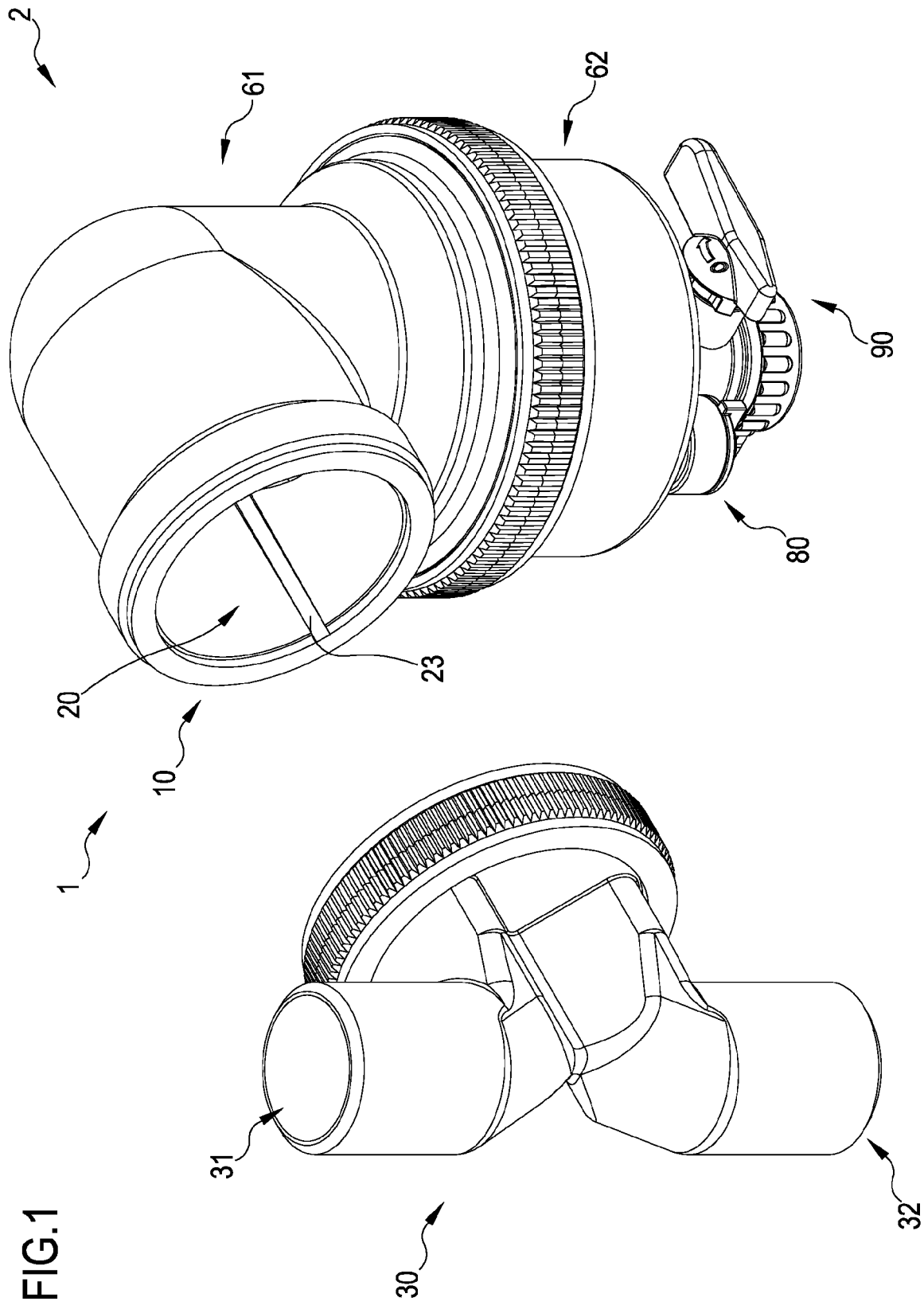
FIG. 1 shows a perspective view, partially exploded, of a possible embodiment of a device for filtering a fluid according to the present invention.
Figure 2:
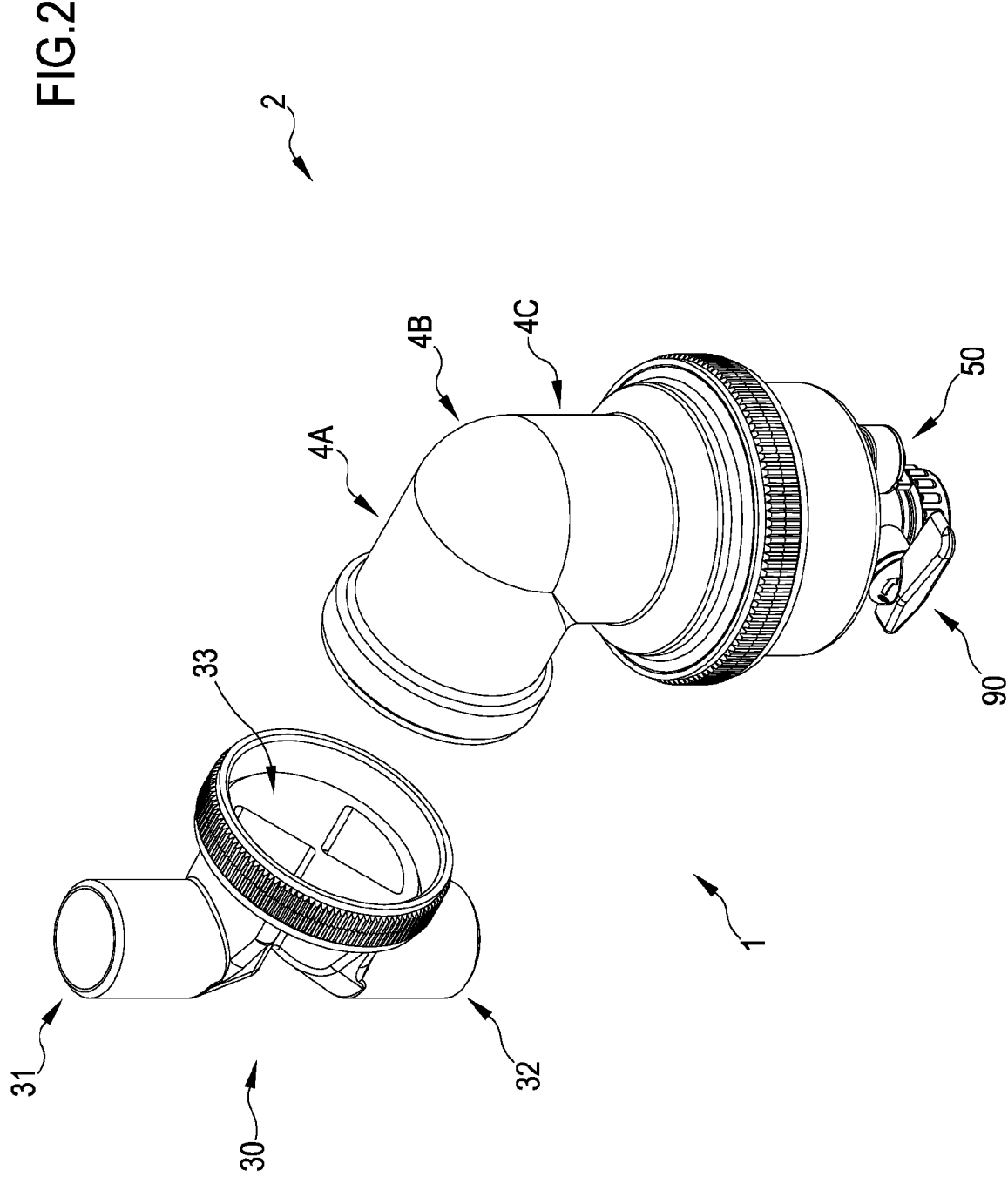
FIG. 2 shows a further perspective view, partially exploded, of the device of FIG. 1.

With reference to the figures cited, a device for filtering a fluid in accordance with the present invention is indicated in its entirety by the reference number 1. In general, the same reference number is used for elements that are the same or similar, possibly in variants of embodiments thereof.

The device 1 is destined to perform filtering of the fluid, typically water, circulating inside a plumbing and heating system, usually comprising piping and conduits, valves, a boiler or a power generator, pumps, radiating elements (heaters, radiators, floor coils, etc.), utilities, etc.

In the figures, the system for which the device is destined is not shown or disclosed in detail because it is per se known in the technical sector of the present invention.

Preferably, the filtration device is destined to be installed in series with a piping of a heating system, in order to intercept the flow of fluid therein and perform a filtration thereon, such an installation in series entailing the interruption of the piping and the interposition of the device, restoring the flow of fluid in the piping itself. The interruption of the piping defines a pipe upstream of the device, which sends incoming fluid to the device, and a pipe downstream of the device, which receives outgoing filtered fluid from the device.

The device 1 comprises first of all a body 2 defining therewithin a filtration chamber 3 destined to be passed through by a fluid to be subjected to filtration. The body 2 is equipped with an inlet/outlet interface 10 configured to allow the entry and the exit of the fluid into, and from, said filtration chamber 3.

The body 2 further comprises filtering members 40, which can be housed or positioned at least partially inside the filtration chamber 3, or associated with the body 2 (for example, outside thereof), and that are configured to perform a filtering of the fluid passing through the filtration chamber 3. Preferably the filtering members 40 comprise at least one filtering element 41 configured to perform a mechanical separation of substances and solid particles present in the fluid to be treated from the fluid in which they are suspended. The filtering element 41 is arranged inside the filtration chamber 3 so as to divide it into a first half-chamber 8 and a second half-chamber 9, and in such a manner that the fluid transiting in the filtration chamber passes through the filtering element in order to pass from the first half-chamber 8 to the second half-chamber 9, or vice versa.

The body 2 further comprises:
  a first inlet/outlet opening 11, defined on a portion of the inlet/outlet interface 10, which sets the first half-chamber 8 in communication with the outside of the body 2 and is configured to receive fluid entering the body or to send fluid exiting from the body;
  a second inlet/outlet opening 12, defined on a respective portion of the inlet/outlet interface 10 and distinct and separate from the first inlet/outlet opening 11, which sets said second half-chamber 9 in communication with the outside of the body and is configured to send fluid exiting from the body or receive fluid entering the body.

Preferably, the first half-chamber 8 is in fluid communication, without passing through the filtering element 41, only with the first inlet/outlet opening 11, while the second half-chamber 9 is in fluid communication, without passing through the filtering element 41, only with the second inlet/outlet opening 12.

The device further comprises a connection module 30 mountable, preferably removably or reversibly, on the body 2 of the device.

The connection module 30 comprises a first inlet/outlet conduit 31, associable with a pipe of a heating system in order to receive therefrom, or send thereto, fluid entering, or exiting from, said body of the device, and a second inlet/outlet conduit 32, associable with a respective pipe of a heating system in order to send thereto, or receive therefrom, fluid exiting from, or entering, said body of the device.

The connection module 30 further comprises a connection interface 33 configured to be selectively associated, according to a plurality of operative configurations, with said inlet/outlet interface 10 of the body 2 of the device.

The connection module 30 comprises:

a first passage section 34, defined on a portion of the connection interface 33, in fluid communication with the first inlet/outlet conduit 31;
a second passage section 35, defined on a respective portion of the connection interface 33 and distinct and separate from the first passage section, in fluid communication with the second inlet/outlet conduit 32.

The device of the present invention entails that the connection module 30 is selectively mountable on the body 2, according to a plurality of different operative configurations. This plurality of operative configurations comprises at least:

a first operative configuration, wherein the connection module 30 and the body 2 have a first reciprocal positioning which determines:
  the correspondence of the first passage section 34 with at least one portion of the first inlet/outlet opening 11 of the body 2, with a fluid connection of the first inlet/outlet conduit 31 exclusively with the first half-chamber 8, and
  the correspondence of the second passage section 35 with at least one portion of the second inlet/outlet opening 12 of the body 2, with a fluid connection of the second inlet/outlet conduit 32 exclusively with the second half-chamber 9;
a second operative configuration, wherein the connection module 30 and the body 2 have a second reciprocal positioning which determines:
  the correspondence of the first passage section 34 with at least one respective portion of the first inlet/outlet opening 11 (at least partially distinct from the portion of the first operative configuration) of the body 2, with a fluid connection of the first inlet/outlet conduit 31 exclusively with the first half-chamber 8, and
  the correspondence of the second passage section 35 with at least one respective portion of the second inlet/outlet opening 12 (at least partially distinct from the portion of the first operative configuration) of the body 2, with a fluid connection of the second inlet/outlet conduit 32 exclusively with the second half-chamber 9.

Preferably the passage between the first and the second operative configuration entails a (reciprocal) rotation of the connection module relative to the body of the device.

Preferably the plurality of operative configurations comprises:

a third operative configuration, wherein the connection module 30 and the body 2 have a third reciprocal positioning which determines:
  the correspondence of the first passage section 34 with at least one respective portion of the second inlet/outlet opening 12 of the body 2, with a fluid connection of the first inlet/outlet conduit 31 exclusively with the second half-chamber 9, and
  the correspondence of the second passage section 35 with at least one respective portion of the first inlet/outlet opening 11 of the body 2, with a fluid connection of the second inlet/outlet conduit 32 exclusively with the first half-chamber 8;
a fourth operative configuration, wherein the connection module 30 and the body 2 have a fourth reciprocal positioning which determines:
  the correspondence of the first passage section 34 with at least one respective portion of the second inlet/outlet opening 12 (at least partially distinct from the portion of the third operative configuration) of the body 2, with a fluid connection of the first inlet/outlet conduit 31 exclusively with the second half-chamber 9, and the correspondence of the second passage section 35 with at least one respective portion of the first inlet/outlet opening 11 (at least partially distinct from the portion of the third operative configuration) of the body 2, with a fluid connection of the second inlet/outlet conduit 32 exclusively with the first half-chamber 8.

Preferably the passage between the third and the fourth operative configuration entails a respective (reciprocal) rotation of the connection module relative to the body of the device.

In substance, it is preferably possible to reciprocally mount the connection module (which is connected, and intercepts, the pipes carrying the flow of fluid to be subjected to filtration) to the body 2 (where the filtration takes place) in four different operative configurations, for example based on the orientation and the direction of the pipes. It is therefore possible to suitably orient the connection module maintaining the positioning of the body 2 unchanged, which is typically arranged with the filtration chamber vertical and the bottom of this chamber in the lower position, as will be shown hereinbelow, and as is shown in the accompanying figures.

In each configuration the flow enters from one of the two conduits of the connection module, passes through the corresponding passage section and from here passes into one of two inlet/outlet openings and then into one of the two half-chambers; subsequently the flow passes through the filtering element and starts the outlet path, which runs from the other half-chamber, passes through the other inlet/outlet opening, the other passage section and the other conduit of the connection module, from which the filtered fluid exits the device to continue its path in the pipe of the plumbing and heating system.

The structure and operation of the device are completely symmetrical, in such a way that the filtration is effective regardless of which of the two conduits of the connection module is used for the entry of the fluid and which is used for the exit of the fluid, and hence which of the two chambers receives the fluid to be filtered and which sends the filtered fluid (i.e. the side of the filtering element in which the filtration takes place).

Preferably the passage between the first operative configuration and the second operative configuration entails a rotation of the connection module relative to the body of the device by a rotation angle comprised between 5° and 175°.

Preferably the passage between the first operative configuration and the second operative configuration entails a rotation of the connection module relative to the body of the device by a rotation angle comprised between 30° and 150°.

Preferably the passage between the first operative configuration and the second operative configuration entails a rotation of the connection module relative to the body of the device by a rotation angle comprised between 60° and 120°.

Preferably, for example in the embodiment shown by way of example in the figures, the passage between the first operative configuration and the second operative configuration entails a rotation of the connection module relative to the body of the device by a rotation angle substantially equal to 90°.

Preferably the passage between the third operative configuration and the fourth operative configuration entails a rotation of the connection module relative to the body of the device by a rotation angle comprised between 5° and 175°.

Preferably the passage between the third operative configuration and the fourth operative configuration entails a rotation of the connection module relative to the body of the device by a rotation angle comprised between 30° and 150°.

Preferably the passage between the third operative configuration and the fourth operative configuration entails a rotation of the connection module relative to the body of the device by a rotation angle comprised between 60° and 120°.

Preferably, for example in the embodiment shown by way of example in the figures, the passage between the third operative configuration and the fourth operative configuration entails a rotation of the connection module relative to the body of the device by a rotation angle substantially equal to 90°.

Preferably the passage between the first operative configuration and the third operative configuration, and/or the passage between the second operative configuration and the fourth operative configuration entails a rotation of the connection module relative to the body of the device by a rotation angle comprised between 95° and 265°.

Preferably the passage between the first operative configuration and the third operative configuration, and/or the passage between the second operative configuration and the fourth operative configuration entails a rotation of the connection module relative to the body of the device by a rotation angle comprised between 120° and 240°.

Preferably the passage between the first operative configuration and the third operative configuration, and/or the passage between the second operative configuration and the fourth operative configuration entails a rotation of the connection module relative to the body of the device by a rotation angle comprised between 150° and 210°.

Preferably, for example in the embodiment shown by way of example in the figures, the passage between the first operative configuration and the third operative configuration, and/or the passage between the second operative configuration and the fourth operative configuration entails a rotation of the connection module relative to the body of the device by a rotation angle substantially equal to 180°.

Preferably each passage between a pair of different operative configurations entails a respective rotation of the connection module 30 relative to the body 2 of the device without translations of these two elements.

Figure 9:
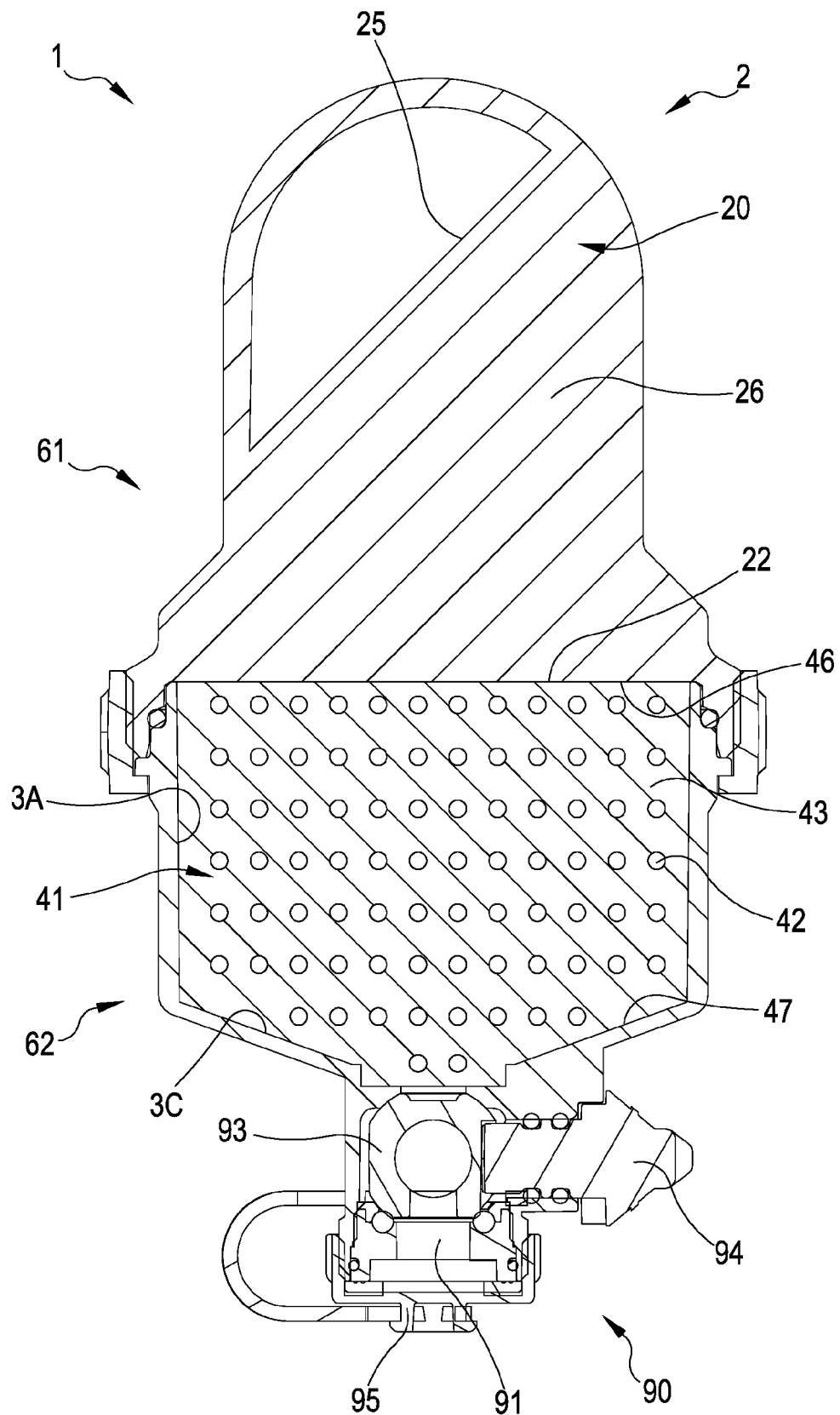
FIG. 9 shows a further sectional view, along the plane IX-IX, of the device of FIG. 7.
Figure 10:
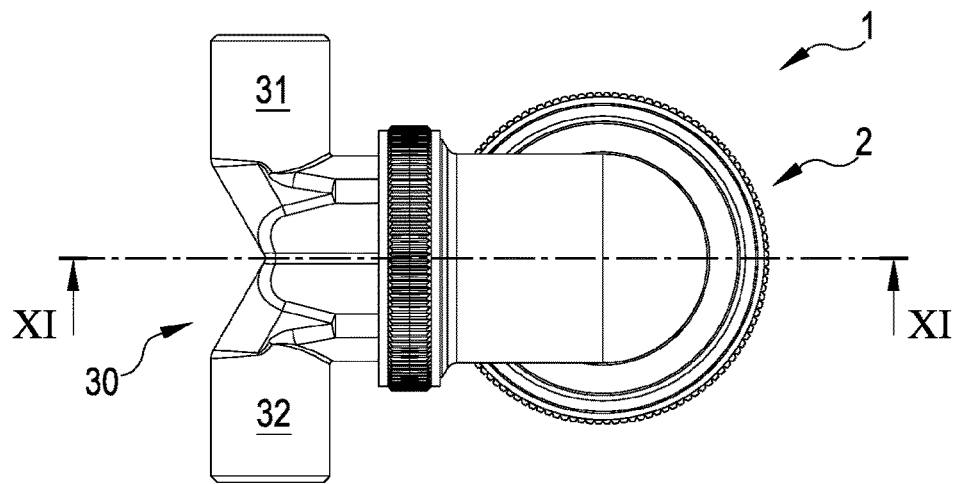
FIG. 10 shows a top view of the device of FIG. 1 in a second operative configuration.
Figure 11:
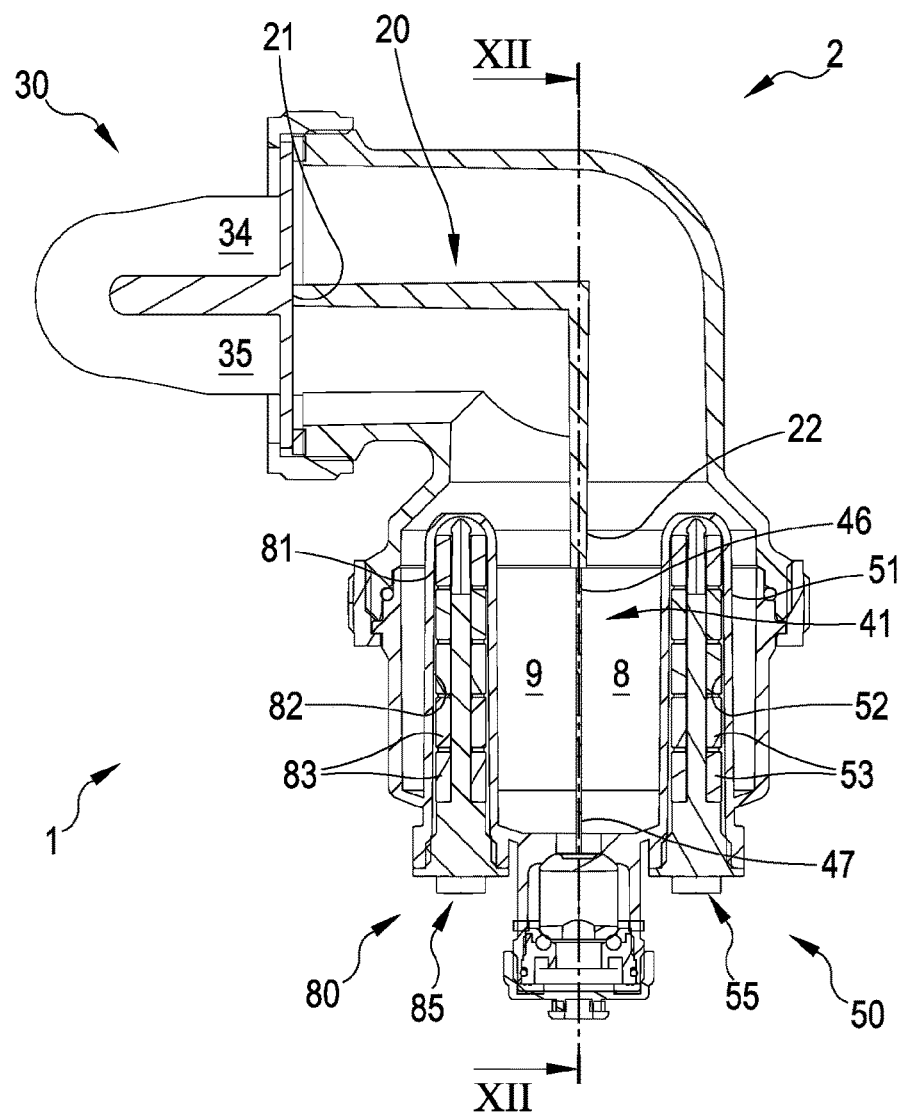
FIG. 11 shows a sectional view, along the plane XI-XI, of the device of FIG. 10.
Figure 12:
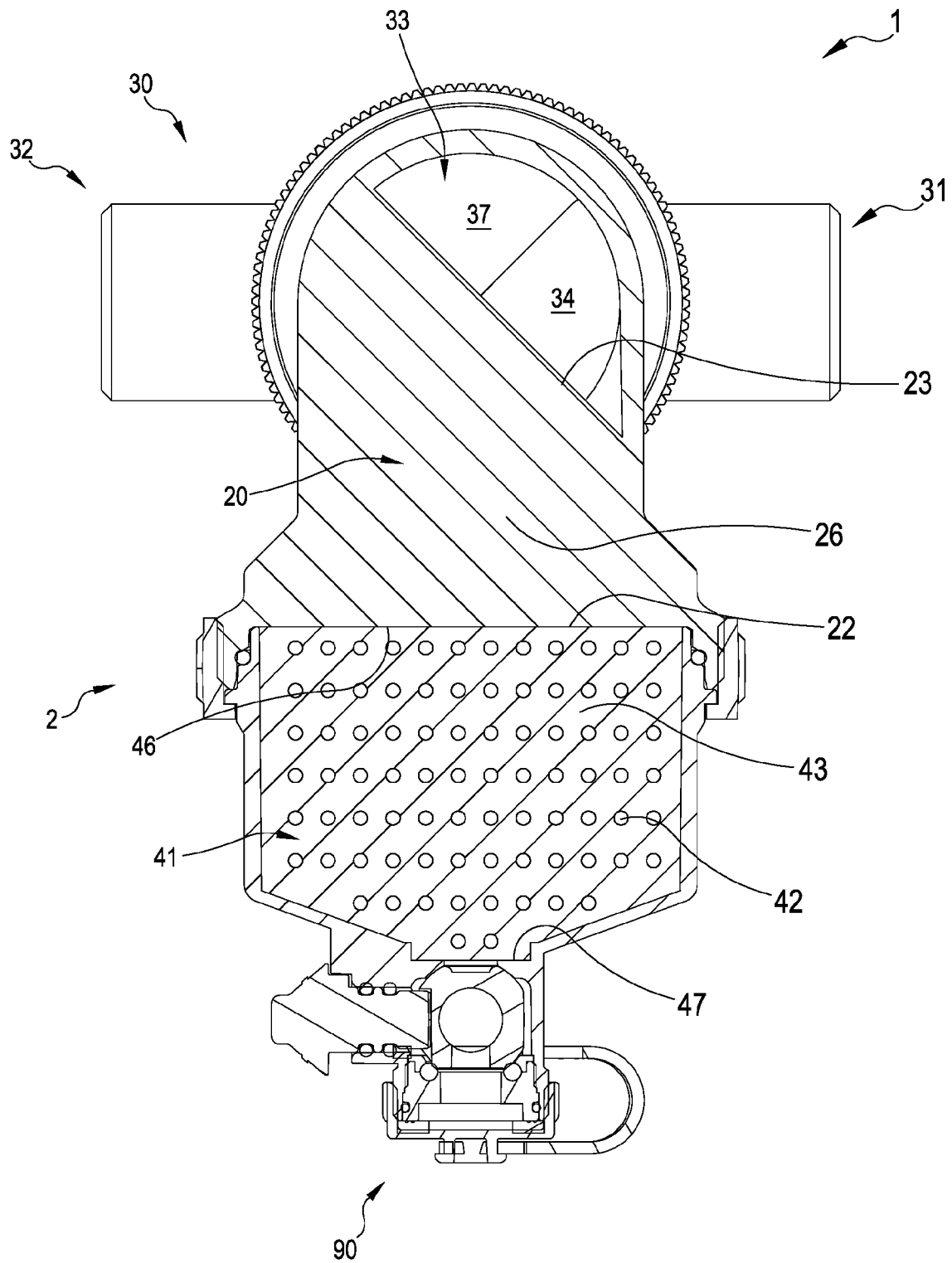
FIG. 12 shows a further sectional view, along the plane XII-XII, of the device of FIG. 10.
Figure 13A:
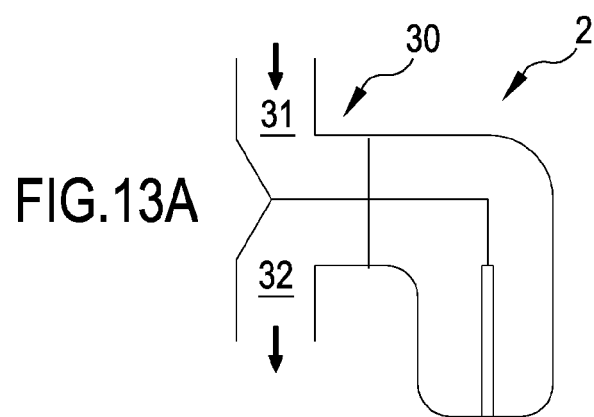
FIGS. 13A-13H show a series of eight schematic representations of different conditions of use of the device according to the present invention.
Figure 13B:
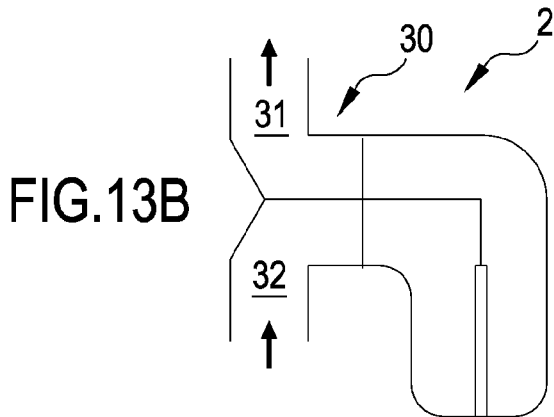
Figure 13C:
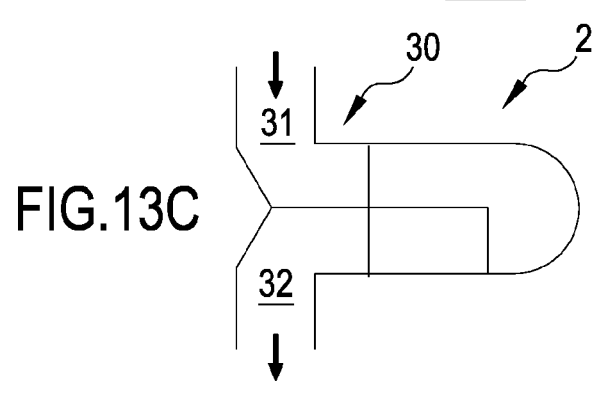
Figure 13D:
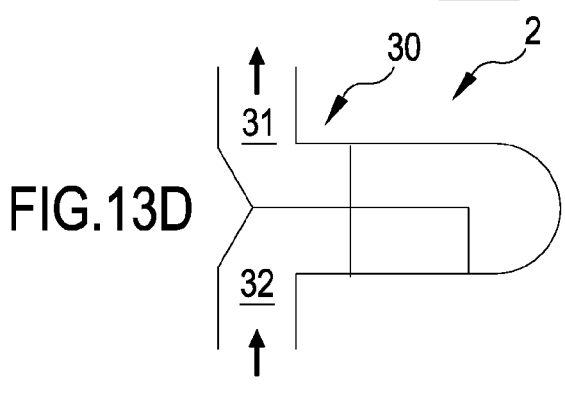
Figure 13E:
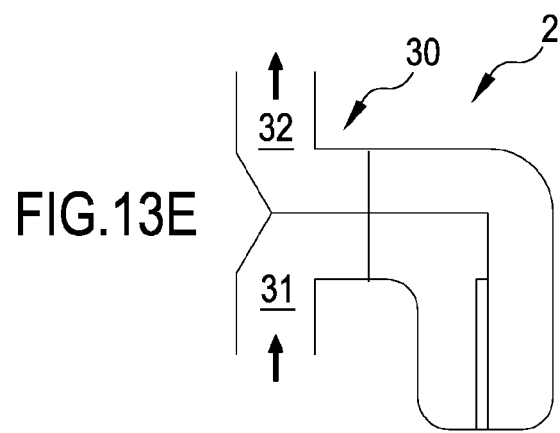
Figure 13F:
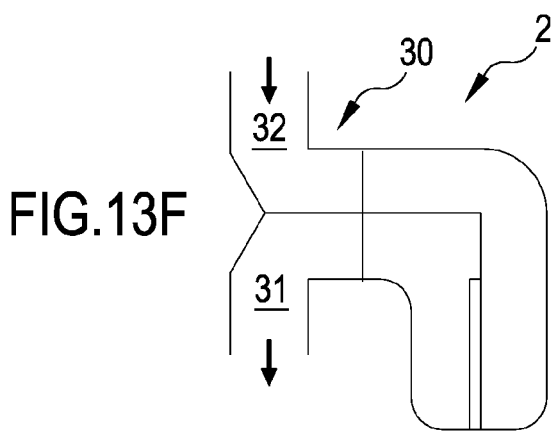
Figure 13G:
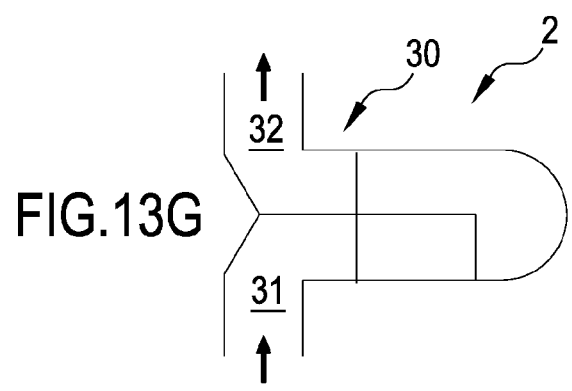
Figure 13H:
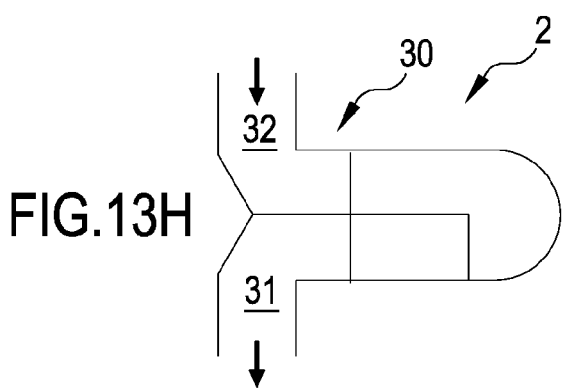

Note that:

FIGS. 7, 8 and 9 show the device in the first operative configuration (the third operative configuration is similar but with the first conduit 31 and second conduit 32 vertically overturned, namely rotated by 180°); in each of said first and third configurations, the flow can enter at the top and exit from the bottom, or enter at the bottom and exit from the top;

FIGS. 10, 11 and 12 show the device in the second operative configuration (the fourth operative configuration is similar but with the first conduit 31 and second conduit 32 horizontally overturned, namely rotated by 180°); in each of said second and fourth configurations, the flow can enter on the right and exit on the left, or enter on the left and exit on the right.

A total of eight conditions of use are obtained—two for each of the four configurations—which will also be described hereinafter.

Preferably, the inlet/outlet interface 10 has a substantially flat circular form, and extends circularly around an interface axis 16.

Preferably the connection interface 33 has a substantially flat circular form, and extends circularly around a respective central axis 36, in which—under device assembly conditions, and in each of the operative configurations—the central axis 36 coincides with the interface axis 16 of the inlet/outlet interface 10.

Preferably the passage between the aforesaid operative configurations is carried out through reciprocal rotations of the connection module 30 relative to the body 2, or vice versa, around the interface axis 16 (or the central axis 36).

Preferably, the rotation from the first to the second operative configuration, from the second to the third operative configuration, from the third to the fourth operative configuration and from the fourth to the first operative configuration, take place in one and the same first direction of rotation relative to the interface axis (or central axis), and the rotation from the first to the fourth operative configuration, from the fourth to the third operative configuration, from the third to the second operative configuration and from the second to the first operative configuration, take place in a same second direction of rotation relative to the interface axis (or the central axis), where the second direction is opposite to the first direction of rotation.

Preferably the first and third configuration are opposite each other, and entail a rotation by a rotation angle substantially equal to 180°.

Preferably the second and fourth configuration are opposite each other, and entail a rotation by a rotation angle substantially equal to 180°.

Preferably, the extent of the first passage section 34 and the extent of the second passage section 35 are smaller than the extent of the first inlet/outlet opening 11 and the extent of the second inlet/outlet opening 12. The term "extent" is intended as the surface or area occupied by the passage section or the inlet/outlet opening on the respective interface (respectively the connection interface and inlet/outlet interface).

Preferably, the extent of the first passage section 34 and the extent of the second passage section 35 are substantially equal.

Preferably the extent of the first inlet/outlet opening 11 and the extent of the second inlet/outlet opening 12 are substantially equal.

Preferably, the first passage section 34 occupies an angular portion of the connection interface 30, relative to the central axis 36 (coincident with the interface axis), and the second passage section 35 occupies an angular portion of the respective connection interface 30, relative to the central axis 36 (coincident with the interface axis), separate and distinct from the portion occupied by the first passage section 34.

Preferably, the first 34 and the second passage section 35 are located on two diametrically opposite portions of the connection interface 30, and are divided by a separation zone 37, not belonging to the first or to the second passage section and not communicating with the first 31 or the second inlet/outlet conduit 32, which divides the connection interface 30 into two halves corresponding precisely to said two diametrically opposed portions.

Preferably the separation zone 37 comprises at least a diameter 38 of the connection interface, when the same has a flat circular form.

Preferably, the first 34 and the second passage section 35 are situated side by side, on the connection interface, and are separate from each other.

Preferably, the first 34 and the second passage section 35 do not extend concentrically from each other.

Preferably, the first inlet/outlet conduit 31 extends inside the connection module 30 to terminate, on the connection interface 33, with the first passage section 34.

Preferably the second inlet/outlet conduit 32 extends inside the connection module 30 to terminate, on the connection interface 33, with the second passage section 35.

Preferably, the filtering element 41 extends longitudinally between an upper end 46 and a lower end 47 (with reference to the orientation shown in the figures).

Preferably, the body 2 of the device comprises a dividing wall 20 extending between a first end 21, at the inlet/outlet interface 10, and from it inside the filtration chamber 3 up to a second end 22, at the upper end 46 of the filtering element 41, and in which the dividing wall 20 is shaped so as to determine, together with the filtering element 41, the division of the filtration chamber 3 into said first half-chamber 8 and second half-chamber 9.

Preferably, the first end 21 of the dividing wall 20 constitutes a dividing segment 23 configured to divide the entire inlet/outlet interface 10 into two portions, corresponding to the first inlet/outlet opening 11 and the second inlet/outlet opening 12.

Preferably, as shown by way of example in the figures, the dividing segment 23 substantially extends over an entire diameter of the inlet/outlet interface 10, when the latter has a flat circular form.

Preferably, in each of the aforesaid operative configurations—when the device is assembled—the dividing segment 23 of the dividing wall 20 is positioned at, or substantially in contact with, said separation zone 37 of the connection interface 33, so that the passage of fluid between the first 34 and the second passage section 35 and the first 11 and the second inlet/outlet opening 12 is enabled only in accordance with the selected operative configuration, and the passage of fluid (i.e. the path) between the first 31 and the second inlet/outlet conduit 32 takes place only through the filtration chamber 3 and the filtering element 41 (and there is no mixing of fluid between the first and second inlet/outlet conduit).

Preferably the angular portion occupied by the first passage section 34 corresponds to a circular sector, substantially 90°, of the connection interface 33, and the respective angular portion occupied by the second passage section 35 corresponds to a respective circular sector, substantially 90°, which is diametrically opposite relative to the circular sector of the first passage section 34.

Preferably the separation zone 37 occupies the remaining part of the connection interface 33 that is not occupied by the first 34 and the second passage section 35.

Preferably the separation zone 37 comprises two circular sectors, each substantially 90°, angularly interposed between the circular sectors of the first and of the second passage section.

Preferably the separation zone extends between a first diameter 38 and a second diameter 39 of the connection interface 33, situated perpendicularly to each other and preferably tangent to the passage sections 34 and 35.

Preferably, the connection interface 33 has an angular alternation, around the central axis 36, of one half of the separation zone 37 and a passage section.

Preferably, passing angularly along the entire connection interface 33, around the central axis 36, the presence can be noted, in sequence, of the first passage section 34, a first half of the separation zone 37, the second passage section 35, a second half of the separation zone 37.

Preferably, the dividing segment 23 divides the entire inlet/outlet interface 10 into two circular sectors (preferably semi-circular), each substantially 180°, corresponding to the first 11 and the second inlet/outlet opening 12.

Preferably, the first 11 and the second inlet/outlet opening 12 are situated side by side, on the inlet/outlet interface 10, and are separate from each other.

Preferably, the first 11 and the second inlet/outlet opening 12 do not extend concentrically between each other.

Preferably, the dividing segment 23 and the separation zone 37 are configured so that—in device assembly conditions—the connection between the body 2 and the connection module 30 is fluid tight towards the outside, and there is no passage of fluid, at the interfaces 10 and 33 in contact, between the passage sections 34, 35 and/or between the inlet/outlet openings 11, 12.

Preferably, in each of the aforesaid operative configurations, the dividing segment 23 is in contact, and fluid tight, with a linear portion of the separation zone 37, and does not intersect the first 34 or the second passage section 35, said linear portion corresponding to a diameter of the connection interface 33.

Preferably:
in the first operative configuration, the dividing segment 23 is positioned at, and aligned with, said first diameter 38 of the separation zone 37;
the passage from the first to the second operative configuration is carried out with a 90° rotation in a first direction (e.g., counter-clockwise) around the interface axis 16, and the passage from the second to the first operative configuration is carried out with a 90° rotation in a second direction (for example clockwise) opposite to the first direction of rotation; note that between the two configurations (rotated reciprocally) there is no change of paths, the first passage section 34 continues to communicate with the first inlet/outlet opening 11 and the second passage section 35 continues to communicate with the second inlet/outlet opening 12.

Preferably:
in the second operative configuration, the dividing segment 23 is positioned at, and aligned with, said second diameter 39 of the separation zone 37;
the passage from the second to the third operative configuration is carried out with a 90° rotation in the first direction, around the interface axis 16, and the passage from the third to the second operative configuration is carried out with a 90° rotation in the second direction; note that between the two configurations (rotated reciprocally) there is a change of paths, the first passage section 34 passes from communication with the first inlet/outlet opening 11 to communication with the second inlet/outlet opening 12 (and vice versa), and the second passage section 35 passes from communication with the second inlet/outlet opening 12 to communication with the first inlet/outlet opening 11 (and vice versa).

Preferably:
in the third operative configuration, the dividing segment 23 is positioned at, and aligned with, said first diameter 38 of the separation zone 37;
the passage from the third to the fourth operative configuration is carried out with a 90° rotation in the first direction, around the interface axis 16, and the passage from the fourth to the third operative configuration is carried out with a 90° rotation in the second direction; note that between the two configurations (rotated reciprocally) there is no change of paths, the first passage section 34 continues to communicate with the second inlet/outlet opening 12 and the second passage section 35 continues to communicate with the first inlet/outlet opening 11.

Preferably:
in the fourth operative configuration, the dividing segment 23 is positioned at, and aligned with, said second diameter 39 of the separation zone 37;
the passage from the fourth to the first operative configuration is carried out with a 90° rotation in the first direction, around said interface axis, and the passage from the first to the fourth operative configuration is carried out with a 90° rotation in the second direction; note that between the two configurations (rotated reciprocally) there is a change of paths, the first passage section 34 passes from communication with the second inlet/outlet opening 12 to communication with the first inlet/outlet opening 11 (and vice versa), and the second passage section 35 passes from communication with the first inlet/outlet opening 11 to communication with the second inlet/outlet opening 12 (and vice versa).

Preferably the passages, in succession, from the first to the second operative configuration, from the second to the third operative configuration, from the third to the fourth operative configuration and from the fourth back to the first operative configuration correspond to a complete rotation (360°) of the connection module 30 relative to the body 2 of the device.

It should be noted that, advantageously, in different operative configurations the orientation of the connection module is changed (which can be rotated as desired), while the body 2 is always positioned vertically to allow the decanting of the filtered material (and its subsequent removal, illustrated hereinafter).

Vertical positioning is intended as an orientation of the body of the device (and in particular the filtration chamber) in accordance with a vertical axis facing the floor of the installation site.

Note that, moreover, each different reciprocal rotation between the connection module and the body of the device defines a respective operative configuration; in other words the reciprocal rotation between the connection module and the body of the device—preferably taking place continuously and not in a discrete manner—through a plurality of operative configurations of which the first, second, third and fourth operative configuration constitute a subset (associated with given rotation angles). The only condition for the definition of a properly functioning operative configuration is that the first and the passage section are not straddling the dividing segment, i.e. are not simultaneously at and in fluid communication with both the first inlet/outlet opening and the second inlet/outlet opening. In fact, as explained above, in each operative configuration the first passage section is only in communication with one among the first inlet/outlet opening and the second inlet/outlet opening, and the second passage section is only in communication with the other among the first inlet/outlet opening and the second inlet/outlet opening. In this way there is no possibility of mixing or the passage of fluid between the flows associated with the first and second inlet/outlet conduit, and the fluid always follows a correct path within the filtration chamber of the body of the device; the passage between the first and the second inlet/outlet conduit only takes place through the two half-chambers and through the filtering element.

Preferably: in the first and second configuration, if the first conduit 31 receives the fluid entering the device (fluid to be filtered) and the second conduit 32 sends fluid exiting the device (filtered fluid), the first opening 11 of the body constitutes an inlet opening to the filtration chamber 3 and the second opening 12 of the body constitutes an outlet opening from the filtration chamber 3; on the contrary, in the third and fourth configuration, if the first conduit 31 receives the fluid entering the device and the second conduit 32 sends fluid exiting the device, the second opening 12 of the body constitutes the inlet opening to the filtration chamber 3 and the first opening 11 of the body constitutes an outlet opening from the filtration chamber 3.

Preferably the first 31 and the second inlet/outlet conduit 32 are side by side, in the connection module 30, relative to the connection interface 33.

Preferably the first 31 and the second inlet/outlet conduit 32 each have an elbow (or L) shape in opposite directions relative to the central axis 36 of the connection interface 33.

Preferably the first inlet/outlet conduit 31 has a first part connected with the first passage section 34, with its axis parallel to the central axis 36 of the connection interface 33, and a second part, which extends with continuity relative to the first part and leads outside the device, with its axis perpendicular to the central axis 36 of the connection interface 33.

Preferably the second inlet/outlet conduit 32 has a respective first part connected with the second passage section 35, with its axis parallel to the central axis 36 of the connection interface 33, and a respective second part, which extends with continuity relative to the first part and leads outside the device, with its axis perpendicular to the central axis 36 of the connection interface 33.

Preferably the first 31 and the second inlet/outlet conduit 32 have an overall (i.e. considered together) T shape, with the first parts side by side and parallel to each other and the second parts facing opposite directions and aligned between them.

Preferably the second parts of the first 31 and second inlet/outlet conduit 32 are coaxial, and lie on a single installation axis of the device.

Preferably this installation axis is destined, in the assembly conditions of the filtration device in series with a piping of a heating system, to intercept the flow of fluid therein and carry out a filtration on it, to coincide with the longitudinal axis of such piping.

Note that the series assembly entails the interruption of the piping and the creation of two pipes upstream and downstream of the device, to be connected to the first and second inlet/outlet conduit (depending on the desired condition of use).

Preferably the first 31 and the second inlet/outlet conduit 32 are structurally identical to each other. Preferably the connection module 30 is symmetrical relative to a plane of symmetry passing through the central axis 36.

Preferably the plane of symmetry divides the connection module into two identical halves, each comprising:
 a respective inlet/outlet conduit (31; 32);
 a respective half of the connection interface 33;
 a respective passage section (34; 35);
 a respective half of the separation zone 37.

The symmetry allows always having correct connections in each operative configuration and in each rotation of the connection module, maintaining the mounting of the connection module to the body of the device.

Preferably, the passage between the first half-chamber 8 and the second half-chamber 9 necessarily occurs through the filtering element 41.

Preferably, the first half-chamber 8 and the second half-chamber 9 are communicating with each other only through the filtering element 41.

Preferably, as shown by way of example in the figures, the filtering element is a filtering septum 41 that has the form of a thin sheet or membrane, and extends longitudinally over a plane of extension between said upper end 46 and said lower end 47.

Preferably, the filtering septum 41 has, at least in a portion thereof, a structure provided with a plurality of passages 42 that have a given filtering section, so that the passage of the fluid from a first side 43 of the filtering septum 41 to a second side 44 of the filtering septum determines the retention, on the first side 43, of the substances and particles present in the fluid and having dimensions greater than said filtering section, and vice versa the passage of the fluid from the second side 44 to first side 43 determines the retention, on the second side 44, of the substances and particles present in the fluid and having dimensions greater than said filtering section.

Preferably the passages 42 are holes or openings, passing through the first side and the second side. Preferably the passages are distributed preferably uniformly, over the entire structure of the filtering septum.

Preferably the structure of the separating septum has a mesh lattice (or a grid or a net or a fabric) or a plurality of microholes.

It should be observed that the holes 42 indicated in the figures are only indicative; these holes can have different dimensions and/or shapes, depending on the different applications and the desired filtering section.

Preferably the first 8 and the second half-chamber 9 are situated side by side inside the body 2 of the device, and are separate from each other.

Preferably the first 8 and the second half-chamber 9 do not extend concentrically between each other.

Preferably the filtering septum 41 is positioned in the filtration chamber 3 in such a manner that the first side 43 thereof faces the first half-chamber 8 and the second side 44 thereof faces the second half-chamber 9.

Preferably the filtering septum 41 is configured to operate in a single position for use, which is maintained for each one of said plurality of operative configurations taken on by the device, which prevents a direct passage of the fluid, without crossing the filtering septum itself, from the first half-chamber 8 to the second half-chamber 9 or vice versa.

Preferably the filtering septum 41 does not need to be moved when the operative configuration adopted by the device varies. In other words, the filtering septum 41 is always positioned in the same manner, and works properly without its position or configuration needing to be changed.

Preferably the filtering septum 41 is made of a single piece. Preferably the filtering septum 41 is made of plastics or metal, for example stainless steel.

Preferably the filtering septum 41 is configured to operate in a single position for use, which is maintained for each one of said plurality of operative configurations taken on by the device, in which a passage of the fluid from the first half-chamber 8 to the second half-chamber 9 or vice versa takes place through the crossing of the filtering septum itself.

Preferably said operative configurations entail a passage of the fluid through the filtering septum 41, from the first side 43 to the second side 44, when the fluid enters the body 2 of the device from the first inlet/outlet opening 11 (which therefore constitutes an inlet opening) and exits from the body 2 of the device from the second inlet/outlet opening 12 (which therefore constitutes an outlet opening).

Preferably said operative configurations entail a passage of the fluid through the filtering septum 41, from the second side 44 to the first side 43, when the fluid enters the body 2 of the device from the second inlet/outlet opening 12 (which therefore constitutes an inlet opening) and exits from the body 2 of the device from the first inlet/outlet opening 11 (which therefore constitutes an outlet opening).

Preferably the device 1 can operate correctly (i.e. perform the filtration of the fluid) in each of said operative configurations both in the case in which the fluid enters the device from the first inlet/outlet conduit 31 and exits the device from the second inlet/outlet conduit 32, and in the opposite case in which the fluid enters the device from the second inlet/outlet conduit 32 and exits the device from the first inlet/outlet conduit 31.

Preferably the first inlet/outlet conduit 31 and the second inlet/outlet conduit 32 have respective interconnection means configured to fluidly connect the conduit with external water pipes, connections or hydraulic valves.

Preferably, these interconnection means comprises threads or pressure attachments or similar mechanisms.

Preferably the interconnection means of the first 31 and the second inlet/outlet conduit 32 are structurally identical to each other. For example, the first 31 and the second inlet/outlet conduit 32 have standard dimensions for the hydraulic sector, for example a diameter of ¼ inch, ½ inch, ¾ inch, 1 inch.

Preferably, the filtration chamber 3 is laterally delimited by a lateral surface 3A, above by the inlet/outlet interface 10 and below by a bottom surface 3C of the body 2 of the device.

Preferably the filtering septum 41 is positioned longitudinally between the bottom surface 3C and the inlet/outlet interface 10.

Preferably, the filtering septum 41 has two prevalent dimensions, on its plane of extension, and a third reduced dimension, perpendicularly to the plane of extension, in which these two prevalent dimensions are a height of the filtering septum, along a direction coinciding with an axis of longitudinal extension 2A of the body 2 and a width of the filtering septum, along a direction perpendicular to the axis of longitudinal extension of the body.

In the embodiment shown by way of example in the figures, the filtering septum 41 is positioned longitudinally between the bottom surface 3C of the body 2 of the device and the dividing wall 20.

Preferably the above-mentioned height of the filtering septum 41 substantially corresponds to the distance between the bottom surface 3C of the filtration chamber 3 and the second end 22 of the dividing wall 20, in such a way that the filtering septum 41 is in contact (preferably sealingly) on top with the dividing wall 20 and in contact on bottom (preferably sealingly) with (or near) said bottom surface 3C of the filtration chamber 3.

Preferably the above-mentioned width of the filtering septum 41 corresponds with a radial dimension (preferably a diameter) of the filtration chamber 3, so as to be in contact (preferably sealingly) with the lateral surface 3A of the filtration chamber 3. Preferably the third dimension of the filtering septum 41 corresponds to the thickness thereof.

Preferably the dividing wall 20 extends continuously relative to the filtering septum 41, and together with the latter, it contributes to dividing the filtration chamber 3 longitudinally into the first half-chamber 8 and the second half-chamber 9.

Preferably the dividing wall 20 lies at least partially on the plane of extension of the filtering septum 41 and/or the axis of longitudinal extension 2A of the body of the device.

Preferably, as in the embodiment shown by way of example in the figures, the body 2 of the device overall has an L shape and comprises a first portion 4A, extending from the inlet/outlet interface 10 to a central section 4B of the body, and a second portion 4C, extending from the central section 4B up to the bottom surface 3C of the filtration chamber 3.

Preferably, in a condition of use of the device in which the first 31 and the second inlet/outlet conduit 32 of the connection module 30 are connected to pipes of a heating system that run vertically (for example along a vertical wall), the first portion 4A is destined to be arranged horizontally and the second portion 4C is destined to be arranged vertically and below the first portion.

Preferably the first 4A and the second portion 4C together form between them, at the central section 4B, a non-zero angle, preferably of 90°.

Preferably, with the body 2 of the device having an L shape, the longitudinal axis of extension also has an L shape, and comprises a first horizontal part, at the first portion 4A of the body, followed by a second vertical part, at the second section 4C of the body.

Preferably the dividing wall 20 in turn has an L shape (in cross section) and comprises:

a first dividing wall portion 25 extending from the first end 21 thereof, constituting said dividing segment 23 according to a direction substantially in agreement with the first part of the axis of longitudinal extension 2A (with an L shape) of the body of the device, up to the central section 4B of the body 2;

a second dividing wall portion 26, extending continuously from the first wall portion 25, starting from the central section 4B of the body 2, according to a direction substantially in agreement with the second part of the axis of longitudinal extension 2A (with an L shape) of the body 2, up to the second end 22 of the dividing wall 20, at the upper end 46 of the filtering septum 41.

Preferably the second wall portion 26 extends, in the second portion 4C of the body 2 of the device, towards the bottom surface 3C of the body at least up to a height coinciding with the dimensions of the first section 4A of the body on the lateral surface 3A of the body.

This shape allows managing the entrance and exit of fluid from the body 2 in the first portion 4A thereof, which are typically affected by turbulent motions of the fluid flow, while the filtration is performed in the second portion 4C of the body 2, which houses the filtering septum 41 and is—thanks to the L-shaped body structure—angled and (in use) lowered relative to the first portion 4A. The second wall portion, which descends until the above-mentioned height, allows restraining the turbulent motion of the fluid in the first portion 4A and conveying the flow in the second portion 4C, in which the filtering septum 41 can effectively operate, separating the substances and solid particles present in the fluid and allowing their settling at the bottom of the filtration chamber. Preferably, the body 2 of the device has a substantially cylindrical shape or bent "elbow" cylinder shape (defining the above-mentioned first 4A and second portions 4C of the body).

Preferably the filtration chamber 3 is divided with continuity, starting from the inlet/outlet interface 10 up to the bottom surface 3C of the body, from the dividing wall 20 and subsequently from the filtering septum 41, so as to obtain the first half-chamber 8 and the second half-chamber 9 separated from each other for the entire longitudinal extension of the body and side by side each other (in each cross section of the body).

Preferably the first 8 and the second half-chamber 9, in each cross section of the body of the device (perpendicular to the axis of longitudinal extension 2A), substantially occupy half of the cross section.

Preferably the first 8 and the second half-chamber 9 start from the inlet/outlet interface 10 and continue separately to the bottom 3C of the body 2, the passage between one half-chamber and the other being able to take place only through the filtering element (or filtering septum 41).

Preferably the fluid flows through the portions of the first 8 and second half-chamber 9 defined by the dividing wall 20 in a guided manner (in accordance with the selected operative configuration) and without filtration, while at the filtering septum 41 there is the passage of fluid (with filtration) between the first and the second half-chamber.

In one possible alternative embodiment (not shown) the upper end of the filtering element can coincide with the dividing segment, and the filtering element extends from the inlet/outlet interface to the bottom of the body of the device. In this case there is no dividing wall present and the entire division of the filtration chamber into the first and second half-chamber is carried out by the filtering element. In this case, moreover, the aforesaid plurality of passages of the filtering element, having a specific filtering section, is present along the entire extension of the first and second half-chamber, and the passage of fluid (with filtration) between the first and the second half-chamber (in accordance with the selected operative configuration) can occur in each portion of the filtration chamber from the inlet/outlet interface to the bottom of the body of the device. The filtering element can have an L shape and incorporate the dividing wall described above.

Preferably the dividing wall 20 is fixed relative to the body 2 of the device.

Preferably, the dividing wall 20 can be made in a single piece with the body 2 of the device.

Preferably the connection module 30 and the body 2 of the device are interconnected by means of a threaded coupling, for example by means of a ring nut, which allows selecting and changing the reciprocal angular position, around the interface axis 16 of the connection module 30 relative to the body 2, and allows the passage between the aforesaid operative configurations.

Preferably the filtering members 40 comprise at least one first magnetic filter 50 associated with the body 2 of the device and configured to collect and retain substances and ferrous particles (or in general provided with ferromagnetic properties) that are present in the fluid to be treated, so as to separate the particles from the fluid that passes through the device.

Preferably the body 2 of the device comprises at least a first hollow protuberance 51 that emerges axially, in the filtration chamber 3, from the bottom surface 3C, said first hollow protuberance 51 defining, outside the body 2, a first housing 52 that is elongated in shape corresponding (negatively) to the first hollow protuberance 51 and accessible from a lower surface 7 of the body, said first housing 52 accommodating the first magnetic filter 50.

Preferably, the first hollow protuberance 51 emerges axially inside the first half-chamber 8 or, alternatively, the second half-chamber 9.

Preferably, the first magnetic filter 50 comprises at least one first magnetic element 53, configured to generate a permanent magnetic field, inserted into the first housing 51 of the body 2 so as to act on the fluid passing through the filtration chamber 3 and retain the ferromagnetic substances and particles present in the fluid on the surface of the first hollow protuberance 51 inside the body of the device. Substantially, the first magnetic filter 50 is positioned "inside" the filtration chamber 3, although it is physically inside the first housing 52 that is accessible from the outside of the body 2 without accessing the filtration chamber.

Preferably the first hollow protuberance 51, emerging from the bottom surface 3C, is laterally distanced from the filtering septum 41, and is contained completely inside the first half-chamber (or alternatively the second half-chamber).

In this configuration, although the first magnetic filter 50 is not in direct contact with the flow, or is not licked directly by the fluid circulating in the filtration chamber, owing to the position and to the magnetic effect thereof it enables the ferrous particles to be blocked on the first hollow protuberance inside the body.

In an alternative embodiment that is not shown, the magnetic filter can be housed directly inside the filtration chamber.

Preferably, the magnetic filter 50 comprises a plurality of first magnetic elements 53 associated with one another to form a first rod-shaped magnetic cartridge 54 inserted axially into the first housing 52 of the body of the device.

Preferably, the first magnetic cartridge 54 comprises a first cap 55 adapted to be removably associated with the access to the first housing 52, on the lower surface 7, so as to close said first magnetic cartridge 54 inside the first housing 52 and to permit if necessary the extraction thereof.

Preferably, the body 2 comprises a first half-body 61 and a second half-body 62 that are removably associated with one another, in which:

the assembling of the first half-body 61 with the second half-body 62 defines the filtration chamber 3, inside the body of the device, fluid-tight to the outside except for the first 11 and the second inlet/outlet opening 12;

the disassembling of the first half-body 61 from the second half-body 62 enables the filtration chamber 3 to be accessed and the filtering septum 41 to be positioned and cleaning or maintenance tasks to be performed.

Preferably:

the first half-body 61 comprises the inlet/outlet interface and the dividing wall 20 (if present);

the second half-body 62 comprises the bottom surface 3C and the first hollow protuberance 51.

Preferably, the lateral surface 3A of the filtration chamber 3 is defined partially by the first half-body 61 and partially by the second half-body 62.

Preferably, the first half-body and the second half-body are interconnected by a threaded coupling, for example by a ring nut.

Preferably, the body 2 of the device comprises a washer interposed between the first half-body 61 and the second half-body 62, to seal the filtration chamber 3 in assembled condition.

According to the embodiment shown by way of example in the figures, the body 2 of the device can comprise a second hollow protuberance 81 emerging axially, in the filtration chamber 3, from the bottom surface 3C, said second hollow protuberance 81 defining, outside the body 2 of the device, a second housing 82 of elongated shape corresponding to the second hollow protuberance and accessible from the lower surface 7.

Preferably the second hollow protuberance 81 emerges axially inside one of the half-chambers that are not affected by the first hollow protuberance 51.

Preferably the second hollow protuberance 81 emerges axially inside the second half-chamber 9, whereas the first hollow protuberance 51 emerges axially inside the first half-chamber 8.

Preferably the second hollow protuberance 81, emerging from the bottom surface, is laterally distanced from the filtering septum 41, and is contained completely inside the second half-chamber (or alternatively the first half-chamber if the second half-chamber contains the first hollow protuberance).

Preferably, the first magnetic filter 50 can be associated selectively with the first hollow protuberance 51 or with the second hollow protuberance 81 of the body 2 of the device, depending on the selected operative configuration.

This is executable by removing the first cap 55 of the first magnetic filter and moving it to the desired housing 52 or 82.

Preferably, when the first magnetic filter 50 is associated with the first hollow protuberance 51 it performs magnetic filtration of the fluid in transit in the first half-chamber 8, whilst when the first magnetic filter 50 is associated with the second hollow protuberance 81 it performs magnetic filtration of the fluid in transit in the second half-chamber 9. Substantially, the device can comprise two hollow protuberances and just one magnetic filter 50, to be inserted selectively into the first housing 52 or into the second housing 82. In both cases, as the operative configurations always provide a passage of the fluid between the two half-chambers (and always passing through filtering septum 41), magnetic filtering is guaranteed by at least the magnetic filter 50, regardless of the housing into which it is inserted.

In one possible embodiment, the filtering members 40 can further comprise a second magnetic filter 80 associated with the body 2 of the device and configured to catch and retain substances and particles provided with ferromagnetic properties that are present in the fluid to be treated, so as to separate the particles from the fluid that passes through the device. Preferably, the second magnetic filter 80 is structurally identical to the first magnetic filter 50.

Preferably, the second magnetic filter 80 comprises at least one second magnetic element 83, configured to generate a permanent magnetic field, inserted into the second housing of the body 2 so as to act on the fluid passing through the filtration chamber 3 and retain the ferromagnetic substances and particles present in the fluid on the surface of the second hollow protuberance 81 inside the body of the device.

Preferably, the second magnetic element 83 is structurally identical to the first magnetic element 53.

Preferably, the second magnetic filter 80 comprises a plurality of second magnetic elements 83 associated with one another to form a second rod-shaped magnetic cartridge 84 inserted axially into the second housing 82 of the body of the device.

Preferably, the second magnetic cartridge 84 comprises a second cap 85 adapted to be removably associated with the access to the second housing 82, on the lower surface 7, so as to close said second magnetic cartridge 84 inside the second housing 82 and to permit if necessary the extraction thereof.

Preferably, the second magnetic filter 80 is destined to be housed in the second housing 82 whereas the first magnetic filter 50 is destined to be housed in the first housing 52.

In an alternative embodiment (not shown), the first magnetic filter comprises a collar body configured to be removably mounted to the outside of the body of the device, and one or more magnetic elements, associated with the collar body and configured to generate a permanent magnetic field, so as to act on the fluid passing through the filtration chamber and retain the ferromagnetic substances and particles present in the fluid inside the filtration chamber itself. Preferably the collar body has a ring shape and is dimensioned so as to envelop, at least partially, a portion of the outer lateral surface of the body of the device. Preferably, the ring shape of the collar body has a partial interruption, along the circumferential extension of the ring, and the collar body is removably mountable outside the body of the device by a snap-fit movement of the body itself given by the presence of said partial interruption. Preferably, the collar body is made of a material, for example plastics, that enables the collar body to be deformed elastically during the snap-fit movement for the assembling to and disassembling from said body of the device. Preferably the collar body has one or more seats each configured to house, preferably removably, a respective magnetic element. Preferably, the first magnetic filter comprises two, three or more magnetic elements that are housed in the collar body and are arranged circumferentially around the collar body, preferably angularly spaced at regular intervals. Preferably, the first magnetic filter is configured to retain the substances and particles provided with ferromagnetic properties, present in the fluid that passes through the device, on the lateral surface of the filtration chamber, particularly on the portion of lateral surface corresponding to the assembly position, outside the body of the device, of the collar body. It should be noted that the "collar" magnetic filter can also be used in combination with the magnetic filter 50 (or also in combination with the magnetic filter 80) of the "cartridge" type, to increase the effect of magnetic filtration. In fact, the "collar" magnetic filter is positioned externally around the body of the device, whereas the magnetic filters 50 or 80, of the "cartridge" type, are inserted into the housings 52 or 82 created by the protuberances 51 or 81 inside the filtration chamber.

Preferably, the device can comprise a drain cock 90 configured to permit emptying of the filtration chamber, without disassembling the device from the system in which it is installed, without disconnection of the first and second inlet/outlet opening from the respective conduits, and without dismantling the body of the device (in particular the first half-body 61 and the second half-body 62).

Preferably, the drain cock 90 is positioned at a drain opening 91 placed on the bottom surface 3C of the body 2 of the device and selectively enables contents of the filtration chamber 3 to be emptied to permit cleaning or maintenance of the device.

Preferably the drain opening 91 is located, on the bottom surface, straddling the lower end 47 of the filtering septum 41, so as to be laterally in communication with both the first half-chamber 8 and with the second half-chamber 9, but without placing the first and second half-chamber in communication with each other.

Preferably, the drain opening 91 is placed at a lower end of an inclined portion of the bottom surface 3C, extending downwards relative to the lateral surface, this inclined portion enabling the filtered material inside the filtration chamber, in particular by the filtering septum 41, to be conveyed towards the drain opening by the force of gravity or decantation.

In addition, the inclined portion also allows the material captured and retained by the magnetic filters on the inner surface of the protuberances in the filtration chamber to be conveyed towards the drain opening (clearly once the magnetic filters have been extracted).

Preferably, the drain cock 90 can be operated selectively between a closed state, in which the drain opening 91 is intercepted and does not permit the fluid to exit the filtration chamber 3, and an open state, in which the drain opening 91 is set in communication with the outside of the device 1.

Preferably, the drain cock 90 comprises a shutter 93 that is active on the drain opening 91 so as to intercept the drain opening, in said closed state, or leave the passage free through the drain opening, in said open state.

Preferably, the drain cock 90 comprises a knob 94, or similar manual or automatic means for selecting the position of the shutter 93.

Preferably, the drain cock comprises a removable safety cap 95 positioned downstream of the shutter 93 and configured, when placed in position, to close the drain opening even if the knob turns the shutter to the open state.

It should be noted that, advantageously, the drain cock is configured, owing to the positioning of the drain opening, to draw from both half-chambers 8 and 9, so as to permit effective drainage of the filtered material and cleaning of both of the half-chambers. This is particularly relevant since, as explained above, depending on the operative configuration and the type of connection applied to the inlet/outlet conduits, the material can be filtered on the first side 43 or on the second side 44 of the filtering septum 41, and then accumulate in the first half-chamber 8 or in the second half-chamber 9. In each case, the drain cock 90 allows easy cleaning of both of the half-chambers.

The possible conditions of use that can be obtained with the device of the present invention are described below, in accordance with the embodiments shown by way of examples in the figures. These conditions of use, connected to the above-mentioned operative configurations, correspond to different possible operating modes of the device of the present invention. In this sense, note FIGS. 13A-13H which show—schematically—the positioning of the connection module 30 and the body 2 and the direction of the inlet and outlet flows in each condition of use.

Preferably, the device is configured to selectively operate, when in use, and always in an effective manner in one of the following conditions of use:

a first condition of use (FIG. 13A), wherein:
the connection module 30 is mounted on the body 2 of the device according to the first operative configuration;
the first inlet/outlet conduit 31 is destined to be placed in communication with a pipe coming from a plumbing and heating system, in particular a hot water return pipe from a network of heating elements, for receiving a flow of water to subject to filtration (in this condition the first inlet/outlet conduit operates as the inlet conduit);
the second inlet/outlet conduit 32 is destined to be placed in communication with a pipe leading to a central heating unit of the plumbing and heating system, to send thereto the flow of water after filtration (in this condition the second inlet/outlet conduit operates as the outlet conduit);
the flow of fluid input to the first inlet/outlet conduit flows up to the first passage section 34 on the connection interface 33 and flows into the first inlet/outlet opening 11, on the inlet/outlet interface 10, from which it enters the first half-chamber 8, where it is necessarily directed to cross the filtering septum 41 from the first side 43, undergoing a mechanical filtration and exiting from the second side 44 to flow into the second half-chamber 9;
the fluid rises up the second half-chamber 9 up to the inlet/outlet interface, where it crosses the second inlet/outlet opening 12 and flows into the second passage section 35 of the connection interface, from which it flows into the second inlet/outlet conduit 32, and from there exits the device;

a second condition of use (FIG. 13B), wherein:
the connection module 30 is mounted on the body 2 of the device according to the first operative configuration;
the second inlet/outlet conduit 32 is destined to be placed in communication with a pipe coming from a plumbing and heating system, in particular a hot water return pipe from a network of heating elements, for receiving a flow of water to subject to filtration (in this condition the second inlet/outlet conduit operates as the inlet conduit);
the first inlet/outlet conduit 31 is destined to be placed in communication with a pipe leading to a central heating unit of the plumbing and heating system, to send thereto the flow of water after filtration (in this condition the first inlet/outlet conduit operates as the outlet conduit);
the flow of fluid input to the second inlet/outlet conduit 32 flows up to the second passage section 35 on the connection interface and flows into the second inlet/outlet opening 12, on the inlet/outlet interface, from which it enters the second half-chamber 9, where it is necessarily directed to cross the filtering septum 41 from the second side 44, undergoing a mechanical filtration and exiting from the second side 43 to flow into the first half-chamber 8;
the fluid rises up the first half-chamber 8 up to the inlet/outlet interface, where it crosses the first inlet/outlet opening 11 and flows into the first passage section 34 of the connection interface, from which it flows into the first inlet/outlet conduit 31, and from there exits the device;

a third condition of use (FIG. 13C), wherein:
the connection module 30 is mounted on the body 2 of the device according to the second operative configuration;
the first inlet/outlet conduit 31 is destined to be placed in communication with a pipe coming from a plumbing and heating system, in particular a hot water return pipe from a network of heating elements, for receiving a flow of water to subject to filtration (in this condition the first inlet/outlet conduit operates as the inlet conduit);
the second inlet/outlet conduit 32 is destined to be placed in communication with a pipe leading to a central heating unit of the plumbing and heating system, to send thereto the flow of water after filtration (in this condition the second inlet/outlet conduit operates as the outlet conduit);
the flow of fluid input to the first inlet/outlet conduit 31 flows up to the first passage section 34 on the connection interface and flows into the first inlet/outlet opening 11, on the inlet/outlet interface, from which it enters the first half-chamber 8, where it is necessarily directed to cross the filtering septum 41 from the first side 43, undergoing a mechanical filtration and exiting from the second side 44 to flow into the second half-chamber 9;
the fluid rises up the second half-chamber 9 up to the inlet/outlet interface, where it crosses the second inlet/outlet opening 12 and flows into the second passage section 35 of the connection interface, from which it flows into the second inlet/outlet conduit, and from there exits the device;

a fourth condition of use (FIG. 13D), wherein:

the connection module 30 is mounted on the body 2 of the device according to the second operative configuration;

the second inlet/outlet conduit 32 is destined to be placed in communication with a pipe coming from a plumbing and heating system, in particular a hot water return pipe from a network of heating elements, for receiving a flow of water to subject to filtration (in this condition the second inlet/outlet conduit operates as the inlet conduit);

the first inlet/outlet conduit 31 is destined to be placed in communication with a pipe leading to a central heating unit of the plumbing and heating system, to send thereto the flow of water after filtration (in this condition the first inlet/outlet conduit operates as the outlet conduit);

the flow of fluid input to the second inlet/outlet conduit 32 flows up to the second passage section 35 on the connection interface and flows into the second inlet/outlet opening 12, on the inlet/outlet interface, from which it enters the second half-chamber 9, where it is necessarily directed to cross the filtering septum 41 from the second side 44, undergoing a mechanical filtration and exiting from the second side 43 to flow into the first half-chamber 8;

the fluid rises up the first half-chamber 8 up to the inlet/outlet interface, where it crosses the first inlet/outlet opening 11 and flows into the first passage section 34 of the connection interface, from which it flows into the first inlet/outlet conduit, and from there exits the device;

a fifth condition of use (FIG. 13E), wherein:
the connection module 30 is mounted on the body 2 of the device according to the third operative configuration;

the first inlet/outlet conduit 31 is destined to be placed in communication with a pipe coming from a plumbing and heating system, in particular a hot water return pipe from a network of heating elements, for receiving a flow of water to subject to filtration (in this condition the first inlet/outlet conduit operates as the inlet conduit);

the second inlet/outlet conduit 32 is destined to be placed in communication with a pipe leading to a central heating unit of the plumbing and heating system, to send thereto the flow of water after filtration (in this condition the second inlet/outlet conduit operates as the outlet conduit);

the flow of fluid input to the first inlet/outlet conduit 31 flows up to the first passage section 34 on the connection interface and flows into the second inlet/outlet opening 12, on the inlet/outlet interface, from which it enters the second half-chamber 9, where it is necessarily directed to cross the filtering septum 41 from the second side 44, undergoing a mechanical filtration and exiting from the second side 43 to flow into the first half-chamber 8;

the fluid rises up the first half-chamber 8 up to the inlet/outlet interface, where it crosses the first inlet/outlet opening 11 and flows into the second passage section 35 of the connection interface, from which it flows into the second inlet/outlet conduit 32, and from there exits the device;

a sixth condition of use (FIG. 13F), wherein:
the connection module 30 is mounted on the body 2 of the device according to the third operative configuration;

the second inlet/outlet conduit 32 is destined to be placed in communication with a pipe coming from a plumbing and heating system, in particular a hot water return pipe from a network of heating elements, for receiving a flow of water to subject to filtration (in this condition the second inlet/outlet conduit operates as the inlet conduit);

the first inlet/outlet conduit 31 is destined to be placed in communication with a pipe leading to a central heating unit of the plumbing and heating system, to send thereto the flow of water after filtration (in this condition the first inlet/outlet conduit operates as the outlet conduit);

the flow of fluid input to the second inlet/outlet conduit 32 flows up to the second passage section 35 on the connection interface and flows into the first inlet/outlet opening 11, on the inlet/outlet interface, from which it enters the first half-chamber 8, where it is necessarily directed to cross the filtering septum 41 from the first side 43, undergoing a mechanical filtration and exiting from the second side 44 to flow into the second half-chamber 9;

the fluid rises up the second half-chamber 9 up to the inlet/outlet interface, where it crosses the second inlet/outlet opening 12 and flows into the first passage section 34 of the connection interface, from which it flows into the first inlet/outlet conduit 31, and from there exits the device;

a seventh condition of use (FIG. 13G), wherein:
the connection module 30 is mounted on the body 2 of the device according to the fourth operative configuration;

the first inlet/outlet conduit 31 is destined to be placed in communication with a pipe coming from a plumbing and heating system, in particular a hot water return pipe from a network of heating elements, for receiving a flow of water to subject to filtration (in this condition the first inlet/outlet conduit operates as the inlet conduit);

the second inlet/outlet conduit 32 is destined to be placed in communication with a pipe leading to a central heating unit of the plumbing and heating system, to send thereto the flow of water after filtration (in this condition the second inlet/outlet conduit operates as the outlet conduit);

the flow of fluid input to the first inlet/outlet conduit 31 flows up to the first passage section 34 on the connection interface and flows into the second inlet/outlet opening 12, on the inlet/outlet interface, from which it enters the second half-chamber 9, where it is necessarily directed to cross the filtering septum 41 from the second side 44, undergoing a mechanical filtration and exiting from the second side 43 to flow into the first half-chamber 8;

the fluid rises up the first half-chamber 8 up to the inlet/outlet interface, where it crosses the first inlet/outlet opening 11 and flows into the second passage section 35 of the connection interface, from which it flows into the second inlet/outlet conduit 32, and from there exits the device;

an eighth condition of use (FIG. 13H), wherein:
the connection module 30 is mounted on the body 2 of the device according to the fourth operative configuration;

the second inlet/outlet conduit 32 is destined to be placed in communication with a pipe coming from a plumbing and heating system, in particular a hot water return pipe from a network of heating elements, for receiving a flow of water to subject to filtration (in this condition the second inlet/outlet conduit operates as the inlet conduit);

the first inlet/outlet conduit 31 is destined to be placed in communication with a pipe leading to a central heating unit of the plumbing and heating system, to send thereto the flow of water after filtration (in this condition the first inlet/outlet conduit operates as the outlet conduit);

the flow of fluid input to the second inlet/outlet conduit 32 flows up to the second passage section 35 on the connection interface and flows into the first inlet/outlet opening 11, on the inlet/outlet interface, from which it enters the first half-chamber 8, where it is necessarily directed to cross the filtering septum 41 from the first side 43, undergoing a mechanical filtration and exiting from the second side 44 to flow into the second half-chamber 9;

the fluid rises up the second half-chamber 9 up to the inlet/outlet interface, where it crosses the second inlet/outlet opening 12 and flows into the first passage section 34 of the connection interface, from which it flows into the first inlet/outlet conduit 31, and from there exits the device.

It should be noted that, in order to illustrate how the inlet/outlet conduits operate in different conditions of use, FIGS. 13A, 13B, 13E and 13F show the device in side view (and sectioned), while the FIGS. 13C, 13D, 13G and 13H show the device in a top view (and sectioned).

It should be noted that in the first, second, fifth and sixth condition of use (13A, 13B, 13E and 13F) the pipe to intercept is vertical, the axis of the inlet/outlet conduits is vertical and parallel to the longitudinal axis of the second portion the body of the device (where the filtering septum is located).

It should be noted that in the third, fourth, seventh and eighth condition of use (13C, 13D, 13G and 13H) the pipe to intercept is horizontal, the axis of the inlet/outlet conduits is horizontal and perpendicular to the longitudinal axis of the second portion the body of the device (where the filtering septum is located).

Preferably, as shown in FIGS. 7-12 and 13A-13H, the body 2 of the device is always in the same position, while in the different conditions of use the position of the connection module changes (by rotation) based on the selected operative configuration and the connection to the first and second inlet/outlet conduits as an entry or as an exit of fluid in, or from, the device.

Furthermore, as shown by the arrows and the numbering of the conduits 31 and 32, in the conditions of use 13F and 13E the connection module is substantially overturned (vertically) relative to the conditions 13A and 13B, while in the conditions of use 13H and 13G the connection module is substantially overturned (horizontally) relative to the conditions 13C and 13D.

For the operation of the device, it is sufficient to connect the conduits 31 and 32 to the pipes upstream and downstream (i.e. in series to the piping carrying the fluid to be subjected to filtration) and mount the body 2 on the connection module 30, making sure that the body is aligned (preferably on a vertical plane) with the connection module and the reciprocal angular positioning is in one of the operative configurations. The device self-configures properly (i.e. the passage sections and the inlet/outlet openings automatically match).

Preferably suitable abutments can be provided on the connection interface (in particular on the separation zone 37 or on the edges of the passage sections 34 and 35) configured to guide the reciprocal positioning of the body and the connection module when—with a suitable rotation—the operative configuration is selected or changed.

In general, regardless of the selected operative configuration, the device 1 is usually supported directly by the two pipes of the system on which it is mounted (i.e. to which the two inlet/outlet openings are mounted).

The method for the filtration of a fluid circulating in a plumbing and heating system according to the present invention corresponds preferably to the operating mode of the device 1. Substantially, this method entails:

arranging a device 1 preferably according to what has been disclosed;

identifying a pipe coming from the plumbing and heating system, in particular a hot water return pipe from a system of heating elements, carrying a flow of water to be subjected to filtration;

identifying a conduit leading to a central heating unit of the plumbing and heating system, this pipe carrying thereto a flow of water that has undergone filtration;

connecting the pipe coming from a plumbing and heating system to either said first or second inlet/outlet conduit (whichever desired);

connecting the pipe leading to a central heating unit of the plumbing and heating system to the other conduit between said first and second inlet/outlet conduit;

selecting one of said operative configurations and mounting the connection module on the body of the device with the correct reciprocal positioning in accordance with the selected operative configuration.

The invention as conceived herein is susceptible to numerous modifications and variants, all falling within the scope of the inventive concept, and the cited components are replaceable by technically equivalent elements.

The invention achieves important advantages. First of all, as emerges clearly from the description set out above, the invention enables at least some of the prior art drawbacks to be overcome.

The device of the present invention enables effective filtration of a fluid circulating in a plumbing and heating system to be achieved, and to be achieved in every operative configuration. In particular, regardless of which conduit acts as an inlet and which acts as an outlet, the filtration of the fluid is always optimal. In fact, as amply set out above and illustrated in the figures, in each operative configuration—and condition of use—the entire flow of fluid is effectively subjected to both mechanical and magnetic filtration, without any portion of fluid passing through the device without being fully filtered, as occurs on the other hand in the solutions of known type.

Furthermore, the device of the present invention allows choosing at will, without any limitations and maintaining the complete operation of the device—which conduit constitutes the inlet into the device and which conduit constitutes the outlet from the device, overcoming the limitations of the prior art.

This allows the device to adapt to a high number and types of different heating systems and installations, to be able to be installed in any spatial orientation, on any type of piping and even in very limited spaces, and at the same time efficiently perform the required filtering operations. In summary, the device of the present invention is able to operate with uniform high performance regardless of the mode of installation inside a plumbing and heating system This is made possible, in particular, thanks to the shape of the connection module and the body of the device, and to their reciprocal mounting, as well as to the filtering septum and the definition of the two half-chambers of filtration: this makes the filtration always optimal, overcoming the problems of the prior art.

Thus the device of the present invention combines the versatility of use with effectiveness and structural simplicity.

Further, the device of the present invention is characterized by great operating reliability, by less predisposition to faults and malfunctions and can be assembled, disassembled, cleaned and maintained simply and rapidly.

Lastly, the device of the present invention is characterized by a competitive cost and by a simple and rational structure.

The invention claimed is:

1. A device (1) for filtering a fluid circulating in a plumbing and heating system, said device (1) comprising:
   a body (2) of the device which defines therewithin a filtration chamber (3) that is destined to have a fluid to be subjected to filtration pass through the filtration chamber (3), said body (2) being provided with:
      an inlet/outlet interface (10) configured to allow an entry and an exit of the fluid into and from said filtration chamber (3);
      filtering members (40) that are at least partially housed inside said filtration chamber (3), or connected with said body (2) of the device, and configured to carry out filtering of the fluid passing through the filtration chamber (3), wherein said filtering members comprise at least one filtering element (41) configured to perform a mechanical separation of substances and solid particles present in the fluid to be treated from the fluid in which the substances and solid particles are suspended, said filtering element (41) being arranged inside said filtration chamber (3) so as to divide the filtration chamber into a first half-chamber (8) and a second half-chamber (9), and in such a manner that the fluid transiting in the filtration chamber (3) passes through said filtering element (41) in order to pass from said first half-chamber (8) to said second half-chamber (9), or vice versa;
      a first inlet/outlet opening (11), defined on a portion of said inlet/outlet interface (10), which sets said first half-chamber (8) in communication with an outside of the body (2) and is configured to receive fluid entering said body or to send fluid exiting from said body;
      a second inlet/outlet opening (12), defined on a respective portion of said inlet/outlet interface (10) and distinct and separate from said first inlet/outlet opening (11), which sets said second half-chamber (9) in communication with the outside of the body (2) and is configured to send fluid exiting from said body or receive fluid entering said body;
   and wherein:
      the first half-chamber (8) is in fluid communication with the first inlet/outlet opening (11), without passage through the filtering element (41);
      the second half-chamber (9) is in fluid communication with the second inlet/outlet opening (12), without passage through the filtering element (41);
   a connection module (30) mountable on said body of the device, and comprising:
      a first inlet/outlet conduit (31), configured to be connected with a pipe of a heating system in order to receive therefrom, or send thereto, fluid entering or exiting from said device;
      a second inlet/outlet conduit (32), configured to be connected with a respective pipe of a heating system to send thereto, or receive therefrom, fluid exiting from or entering said device;
      a connection interface (33) selectively connected with said inlet/outlet interface (10) of the body (2) of the device;
      a first passage section (34), defined on a portion of said connection interface (33), in fluid communication with said first inlet/outlet conduit (31);
      a second passage section (35), defined on a respective portion of said connection interface (33) and distinct and separate from the first passage section (34), in fluid communication with said second inlet/outlet conduit (32),
   wherein the connection module (30) is configured to be selectively mounted on the body (2) of the device according to a plurality of different operative configurations:
   wherein the inlet/outlet interface (10) has a flat circular form and extends circularly around an interface axis (16), and wherein the connection interface (33) has a flat circular form and extends circularly around a respective central axis (36), and wherein, under conditions of assembly of the device, and in each of said operative configurations, the central axis (36) coincides with said interface axis (16) of the inlet/outlet interface (10);
   wherein the first passage section (34) occupies an angular portion of the connection interface (33), relative to said central axis (36), and the second passage section (35) occupies a respective angular portion of the connection interface (33), relative to said central axis (36), separate and distinct from the portion occupied by the first passage section;
   wherein the angular portion occupied by the first passage section (34) corresponds to a circular sector of the connection interface (33), and the respective angular portion occupied by the second passage section (35) corresponds to a respective circular sector of the connection interface which is diametrically opposite the circular sector of the first passage section (34), and wherein a separation zone (37) occupies a remaining part of the connection interface (33) that is not occupied by the first (34) and the second passage section (35).

2. The device (1) according to claim 1, wherein said plurality of operative configurations comprises:
   a first operative configuration, wherein the connection module (30) and the body (2) of the device have a first reciprocal positioning which determines:
   a correspondence of the first passage section (34) with at least a first portion of the first inlet/outlet opening (11) of the body of the device, with a fluid connection of the first inlet/outlet conduit (31) exclusively with the first half-chamber (8), and
   a correspondence of the second passage section (35) with at least a first portion of the second inlet/outlet opening (12) of the body of the device, with a fluid connection of the second inlet/outlet conduit (32) exclusively with the second half-chamber (9);
   a second operative configuration, wherein the connection module (30) and the body (2) of the device have a second reciprocal positioning which determines:
   a correspondence of the first passage section (34) with at least a second portion of the first inlet/outlet opening

(11) of the body of the device, with a fluid connection of the first inlet/outlet conduit (31) exclusively with the first half-chamber (8), and a correspondence of the second passage section (35) with at least a second portion of the second inlet/outlet opening (12) of the body of the device, with a fluid connection of the second inlet/outlet conduit (32) exclusively with the second half-chamber (9);

wherein the passage between the first and the second operative configuration entails a rotation of the connection module (30) relative to the body (2) of the device.

3. The device (1) according to claim 2, wherein said plurality of operative configurations comprises:

a third operative configuration, wherein the connection module (30) and the body (2) of the device have a third reciprocal positioning which determines:

a correspondence of the first passage section (34) with at least a third portion of the second inlet/outlet opening (12) of the body of the device, with a fluid connection of the first inlet/outlet conduit (31) exclusively with the second half-chamber (9), and a correspondence of the second passage section (35) with at least a third portion of the first inlet/outlet opening (11) of the body of the device, with a fluid connection of the second inlet/outlet conduit (32) exclusively with the first half-chamber (8);

a fourth operative configuration, wherein the connection module (30) and the body (2) of the device have a fourth reciprocal positioning which determines:

a correspondence of the first passage section (34) with at least a fourth portion of the second inlet/outlet opening (12) of the body of the device, with a fluid connection of the first inlet/outlet conduit (31) exclusively with the second half-chamber (9), and a correspondence of the second passage section (35) with at least a fourth portion of the first inlet/outlet opening (11) of the body of the device, with a fluid connection of the second inlet/outlet conduit (32) exclusively with the first half-chamber (8);

wherein the passage between the third and the fourth operative configuration entails a respective rotation of the connection module (30) relative to the body (2) of the device.

4. The device (1) according to claim 3, wherein the passage between the first operative configuration and the second operative configuration entails a rotation of the connection module (30) relative to the body (2) of the device by a rotation angle of between 30° and 150°, or wherein the passage between the third operative configuration and the fourth operative configuration entails a rotation of the connection module (30) relative to the body (2) of the device by a rotation angle of between 30° and 150°.

5. The device (1) according to claim 3, wherein the passage between the aforesaid operative configurations takes place through reciprocal rotations of the connection module (30) relative to the body (2) of the device or, vice versa, around the interface axis (16).

6. The device (1) according to claim 5, wherein the passages from the first to the second operative configuration, from the second to the third operative configuration, from the third to the fourth operative configuration and from the fourth to the first operative configuration, take place in a first direction of rotation relative to the interface axis (16), and the passages from the first to the fourth operative configuration, from the fourth to the third operative configuration, from the third to the second operative configuration and from the second to the first operative configuration, take place in a second direction of rotation relative to the interface axis (16), wherein the second direction is opposite to the first direction of rotation, and/or wherein the first and the third configurations are opposite each other, and entail a rotation by a rotation angle equal to 180°, and the second and the fourth configurations are opposite each other, and entail a rotation by a rotation angle equal to 180°.

7. The device (1) according to claim 1, wherein an extent of the first passage section (34) and an extent of the second passage section (35) are smaller than an extent of the first inlet/outlet opening (11) and an extent of the second inlet/outlet opening (12).

8. The device (1) according to claim 1, wherein the filtering element (41) extends longitudinally between an upper end (46) and a lower end (47), and wherein the body (2) of the device comprises a dividing wall (20) extending inside the filtration chamber between a first end (21) at the inlet/outlet interface (10) and a second end (22) at the upper end (46) of the filtering element (41), and wherein the dividing wall (20) is shaped so as to determine, together with said filtering element (41), a division of the filtration chamber (3) into said first half-chamber (8) and second half-chamber (9), and wherein the first end (21) of the dividing wall (20) constitutes a dividing segment (23) configured to divide the entire inlet/outlet interface (10) into two portions corresponding to said first inlet/outlet opening (11) and second inlet/outlet opening (12), and wherein the dividing segment (23) extends over an entire diameter of the inlet/outlet interface (10), or wherein, in each of said operative configurations—when the device is assembled—the dividing segment (23) of the dividing wall (20) is positioned in, or in contact with, a separation zone (37), not belonging to the first (34) or to the second passage section (35) and not communicating with the first (31) or the second inlet/outlet conduit (32), which divides the connection interface (33) into two halves, so that the passage of fluid between said first (34) and second passage section (35) and said first (11) and second inlet/outlet opening (12) is enabled only in accordance with a selected operative configuration among said plurality of different operative configurations, and the passage of fluid between said first (31) and said second inlet/outlet conduit (32) takes place only though the filtration chamber (3) and the filtering element (41).

9. The device (1) according to claim 1, wherein the angular portion occupied by the first passage section (34) corresponds to a circular sector of 90° of the connection interface (33), and the respective angular portion occupied by the second passage section (35) corresponds to a respective circular sector of 90° of the connection interface, and wherein the separation zone (37) comprises two circular sectors, each of 90°, angularly interposed between the circular sectors of the first (34) and of the second passage section (35).

10. The device (1) according to claim 1, wherein the first (31) and the second inlet/outlet conduit (32) are situated side by side, in the connection module (30), relative to the connection interface (33), and wherein the connection module (30) is symmetrical relative to a plane of symmetry passing through the central axis (36), or wherein the passage between the first half-chamber (8) and the second half-chamber (9) necessarily takes place through the filtering element (41).

11. The device (1) according to claim 8, wherein the filtering element is a filtering septum (41) that has the form of a membrane and extends longitudinally over a plane of extension between said upper end (46) and said lower end (47), and wherein the filtering septum (41) is positioned in the filtration chamber (3) in such a manner that a first side (43) thereof faces the first half-chamber (8) and a second side (44) thereof faces the second half-chamber (9), or wherein the filtering septum (41) is configured to operate in a single position for use which is maintained for each one of said plurality of operative configurations taken on by the device, in which the filtering septum (41) prevents direct passage of the fluid from the first half-chamber (8) to the second half-chamber (9) or vice versa without passage through the filtering septum, and wherein the device operate correctly in each of said operative configurations, both in the case in which the entering fluid enters the device from said first inlet/outlet conduit (31) and exits the device from said second inlet/outlet conduit (32), and in the opposite case in which the fluid enters into the device from said second inlet/outlet conduit (32) and exits the device from said first inlet/outlet conduit (31).

12. The device (1) according to claim 11, wherein the filtration chamber (3) is delimited laterally by a lateral surface (3A), above by the inlet/outlet interface (10) and below by a bottom surface (3C) of the body (2) of the device, and wherein the filtering septum (41) is positioned longitudinally between the bottom surface (3C) and the inlet/outlet interface (10), or wherein the filtering septum (41) has two prevalent dimensions on said plane of extension and a third reduced dimension, perpendicularly to said plane of extension, wherein said two prevalent dimensions are a height of the filtering septum (41) along a direction coinciding with an axis of longitudinal extension (2A) of the body (2) and a width of the filtering septum along a direction perpendicular to the axis of longitudinal extension (2A) of the body (2), or wherein the filtering septum (41) is positioned longitudinally between the bottom surface (3C) of the body (2) of the device and the dividing wall (20), and the dividing wall (20) extends continuously relative to the filtering septum (41), and, together with the filtering septum (41), the dividing wall (20) contributes to dividing the filtration chamber (3) longitudinally into the first half-chamber (8) and the second half-chamber (9).

13. The device (1) according to claim 12, wherein the body (2) of the device overall has an L shape and comprises a first portion (4A), extending from the inlet/outlet interface (10) to a central section of the body (4B), and a second portion (4C), extending from said central section (4B) of the body to the bottom surface (3C) of the filtration chamber (3), and wherein the first (4A) and the second portion (4C) together form, in said central section (4B), a non-zero angle, and wherein, with the L-shaped body (2), said axis of longitudinal extension (2A) has an L shape, and comprises a first horizontal part, in the first portion of the body, followed by a second vertical part, in the second section of the body, and wherein the dividing wall (20) an L shape, and comprises:
a first wall portion (25) extending from the first end (21) thereof, constituting said dividing segment (23) according to a direction in agreement with a first part of the axis of longitudinal extension (2A) of the body of the device, to said central section (4B) of the body;
a second wall portion (26) extending continuously from the first wall portion (25), starting from the central section of the body (4B), according to a direction in agreement with a second part of the axis of longitudinal extension (2A) of the body of the device, to the second end (22) of the dividing wall (20), at the upper end (46) of the filtering septum (41).

14. The device (1) according to claim 12, wherein the filtering members (40) comprise a first magnetic filter (50) connected with the body (2) of the device and configured to collect and retain substances and particles having ferromagnetic properties that are present in the fluid to be treated, in such a manner as to separate said substances and particles having ferromagnetic properties from the fluid passing through the device, and wherein the body (2) of the device comprises a first hollow protuberance (51) that emerges axially, in the filtration chamber, from said bottom surface (3C), said first hollow protuberance (51) defining, outside the body (2) of the device, a first housing (52) that is elongated in shape, corresponding to the first hollow protuberance (51) and accessible from a lower surface (7) of the body, said first housing (52) accommodating the first magnetic filter (50), and wherein said first hollow protuberance (51) emerges axially inside said second half-chamber or, alternatively, inside said first half-chamber, and/or wherein the magnetic filter (50) comprises a first magnetic element (53) that is configured to generate a permanent magnetic field and is inserted in said first housing (52) of the body (2) in such a manner as to act upon the fluid passing through the filtration chamber (3) and retain the ferromagnetic substances and particles present in the fluid on the surface of said first hollow protuberance (51) inside the body of the device.

15. The device (1) according to claim 12, comprising a drain cock (90) configured to enable the filtration chamber (3) to be emptied without disassembling the device from the system in which the device is installed, without disconnecting the first (31) and the second inlet/outlet conduit (32) from the respective pipes of the heating system to which the device is connected, and without disassembling the body (2) of the device, wherein the drain cock (90) is positioned at a drain opening (91) located on the bottom surface (3C) of the body (2) straddling the lower end (47) of the filtering septum (41) in such a manner as to be in communication with the first half-chamber (8) and with the second half-chamber (9), without putting the first and the second half-chamber in communication with each other, and/or wherein the drain opening (91) is located at a respective lower end of an inclined portion of the bottom surface (3C), extending downwards relative to the lateral surface (3A), said inclined portion enabling the material filtered inside the filtration chamber (3) to be conveyed towards the drain opening (91) by gravity or settling.

16. The device (1) according to claim 3, wherein the passage between the first operative configuration and the second operative configuration entails a rotation of the connection module (30) relative to the body (2) of the device by a rotation angle equal to 90°, or wherein the passage between the third operative configuration and the fourth operative configuration entails a rotation of the connection module (30) relative to the body (2) of the device by a rotation angle equal to 90°, or wherein the passage between the first operative configuration and the third operative configuration, and the passage between the second operative configuration and the fourth operative configuration, entails a rotation of the connection module (30) relative to the body (2) of the device by a rotation angle equal to 180°.

17. The device (1) according to claim 1, wherein the first (34) and the second passage section (35) are located on two diametrically opposite portions of the connection interface (33), and are divided by a separation zone (37), not belonging to the first (34) or to the second passage section (35) and not communicating with the first (31) or the second inlet/outlet conduit (32), which divides the connection interface (33) into two halves corresponding to said two diametrically opposite portions, or wherein the first (34) and the second passage section (35) are situated side by side on the connection interface (33), and are separate from each other.

18. The device (1) according to claim 17, wherein the separation zone (37) extends between a first diameter (38) and a second diameter (39) of the connection interface (33), situated perpendicularly to each other and tangent to the passage sections (34, 35), or wherein the dividing segment (23) divides the entire inlet/outlet interface (10) into two circular sectors corresponding to the first (11) and to the second inlet/outlet opening (12), or wherein the first (11) and the second inlet/outlet opening (12) are situated side by side on the inlet/outlet interface (10) and are separate from each other.

19. The device (1) according to claim 1, wherein the filtering element (41) has, at least in one portion thereof, a structure provided with a plurality of passages (42) that have a given filtering section, so that the passage of the fluid from a first side (43) of the filtering element to a second side (44) of the filtering element determines retention, on the first side (43), of the substances and particles present in the fluid and having dimensions greater than said filtering section, and vice versa the passage of the fluid from the second side (44) to the first side (43) determines retention, on the second side (44), of the substances and particles present in the fluid and having dimensions greater than said filtering section, and wherein the first (8) and the second half-chamber (9) are situated side by side inside the body of the device, and are separate from each other.

\* \* \* \* \*